US00H002064H

(19) United States

(12) Statutory Invention Registration (10) Reg. No.: US H2064 H

Buchalter (43) Published: May 6, 2003

(54) AUTOMATED FIXED INCOME TRADING

(75) Inventor: Lawrence Buchalter, Short Hills, NJ (US)

(73) Assignee: Goldman, Sachs & Co., New York, NY (US)

(21) Appl. No.: 09/723,409

(22) Filed: Nov. 28, 2000

(51) Int. Cl.[7] ..... G06F 17/60

(52) U.S. Cl. ..... 705/37

*Primary Examiner*—Daniel T. Pihulic

(74) *Attorney, Agent, or Firm*—Clifford Chance Rogers & Wells LLP

(57) ABSTRACT

A method and system is provided for automated trading of fixed income securities which enables institutional investors, broker dealers and others, to transact directly and anonymously for the purpose of trading investment grade, high yield corporate bonds, municipal bonds or other fixed income securities. A financial institution acting as a Fixed Income Securities system sponsor can act as counterparty to transactions, from trade execution through settlement, and can also serve as a credit intermediary. Computer systems are utilized in conjunction with an electronic communications network to facilitate such fixed income security trading activities. Software routines can direct a trader to various fixed income securities available according to specific criteria put forth by the trader. Software routines can also provide information and services related to the automated trading of fixed income securities. Data relating to trading a fixed income security is transmitted from a Fixed Income Trading (FIT) system and information relating to the sale of a fixed income security is received. A live order, based upon the sale information received, can then be executed or transmitted to a point of execution. The live order provides that the FIT system acts as counterparty to each transaction such that a client trader can remain anonymous to a party on the other side of a trade. In this manner, a first trade can be executed between a party selling a fixed income security and the FIT system, and a second trade can be executed between the FIT system and a party purchasing the fixed income security. In addition, the FIT system operators can commit to market liquidity for the fixed income security traded. Numerous types of fixed income securities can be traded, including investment grade, high yield corporate bonds, municipal bonds or other types of securities.

25 Claims, 35 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BondBook
Screen Structure

AUTOMATED FIXED INCOME TRADING

BACKGROUND

The present invention relates generally to an automated method and system for trading fixed income securities. More specifically the present invention provides an automated trading forum which enables institutional investors, broker dealers and others, to transact and trade directly and anonymously, investment grade corporate bonds, municipal bonds or other fixed income instruments. The system sponsor acts as counterparty to all transactions, from trade execution through settlement, and can also serve as a credit intermediary.

Electronic networks have eliminated many of the costs associated with an open outcry system. Electronic trading systems eliminate the need to maintain a trading representative on a market floor. Small entities and individual investors now have access to information and trading vehicles that were previously available only to institutional investors. However, the complexities of the fixed income market, wherein a multitude of securities each has distinctive characteristics, have caused many trading systems to be limited to a particular type or class of securities. Each fixed income security can have a different combination of structures, credit ratings, coupons, maturities, payment schedules or other characteristics. Although there are no regulatory limitations on the class of trading system, the current electronic trading available is generally relegated into one of five system type categories. These categories include dealer systems, cross-matching systems, primary market auction systems, interdealer systems and retail systems.

Dealer systems are generally constructed such that an investor can execute a transaction concerning fixed income securities directly with a fixed income security dealer. It has been known for a dealer system to use a public network, such as the Internet, or a proprietary network. Proprietary networks can additionally permit trading using consolidated orders involving multiple dealers.

An interdealer system provides anonymous transactions between dealers wherein the trading service acts as a broker's broker. A cross-matching system automatically matches orders that meet a predetermined criteria. The speed and uniform accessibility to the electronic trading platform allows for cross-matching systems to provide real-time trading to all participants. A primary market auction system is specialized towards new debt offerings. Dealers and investors are given an electronic form to bid on new issues. Retail systems generally include on-line brokers which allow individual investors to execute transactions for fixed income securities. Generally, automatic execution of fixed income transactions is limited by regulatory requirements.

It is known to have an electronic transaction system with a database of bond offerings wherein a user can search the database for securities meeting the user's specific criteria. The user can also receive real-time pricing information and conduct transactions on an automatic execution basis. Examples of fixed income securities can include U.S. treasury notes and bonds, federal agency securities, commercial paper instruments, foreign exchange spot, forwards and options, discount notes, municipal securities, repurchase agreements and other security types. An electronic trading system may subject each trade to acceptance by the institution hosting the system. Other systems allow for automatic trades within predetermined constraints.

Tools available as enhancements to an electronic trading system can include a searchable database of bond offerings from multiple dealers and a database of callable and bullet certificates of deposit. Additionally e-mail notification services can also alert users to important information relating to the trades. Information can include changes in federal policy actions, daily or weekly fixed income market wrap-ups, or other pertinent information. Systems can allow a customer to automatically record information relating to trading transactions. Other systems allow customers to determine which dealers will receive a customer inquiry. In turn, the customers only see bids and offers from the predetermined list of dealers.

Electronic systems can also include predetermined time limits between the time of bid or offer and the time of acceptance. For example, a customer may have a limited time to execute a trade at a price on the wire. After the time limit expires, a dealer's price may become a subject price wherein a customer can hit or lift the subject price. However, the dealer retains the option to approve the trade at the subject price. If the market has moved, the dealer may counter with a new price and a new on-the-wire time period. A party can nullify the transactions within the predetermined time periods.

Auction systems can allow dealers and investors to submit bids electronically during a predetermined auction time period. During the auction period, competing bidders can improve bids for a particular issue. The terms of the transaction can include the size and preferred maturity date. Variations on the electronic auctions include "Dutch" auctions which allow a user to anonymously enter a bid. The entire auction bid is equal in size to an aggregate size of the bids still in the money at the close of the auction, and equal in price to that specified by the lowest of such bids, the determining bid.

Other electronic systems such as those offered by the U.S. Treasury Department, allow investors with existing treasury direct accounts to purchase U.S. treasury bills, notes and bonds through the Treasury Department's Website on the Internet with non-competitive bids. Cross-matching systems can match orders on a price/time priority basis according to criteria of the issuer. Orders can be stored and displayed anonymously such that they can be matched according to the predetermined price/time priority.

However none of the known systems provides a liquidity commitment, which can be essential to the success of a trading environment. There is a growing call from market participants and regulators for broader access and enhanced price transparency in the fixed income market. In addition, it would be useful to consolidate a fragmented market and establish greater liquidity in the bond market. What is needed is a system which will allow direct trading between anonymous market participants and provide price transparency, as well as a commitment to liquidity. However, the market size and complexity for fixed income products and the established roles of market participants have heretofore hindered such an embodiment.

SUMMARY

Accordingly, the present invention includes a method and system providing automated trading of fixed income securities which can enable institutional investors, broker dealers and others, to transact directly and anonymously for the purpose of trading investment grade, high yield corporate bonds, municipal bonds or other fixed income securities. A financial institution acting as a fixed income security trading system sponsor can act as counterparty to transactions from trade execution through settlement, and can also serve as a credit intermediary. Computer systems are utilized in conjunction with an electronic communications network to facilitate fixed income security trading activities. Software routines are utilized to direct a trader to various fixed income securities available according to specific criteria put forth by the trader. Software routines can also provide information and services related to the automated trading of fixed income securities.

In one embodiment, the present invention provides a computer-implemented method for providing fixed income securities via a communications network such as the Internet. Data relating to trading a fixed income security is transmitted from a Fixed Income Trading (FIT) system and information relating to the sale of a fixed income security is received. A live order, based upon the sale information received, can then be executed or transmitted to a point of execution. The live order provides that the FIT system acts as counterparty to each transaction such that a client trader can remain anonymous to a party on the other side of a trade. In this manner, a first trade can be executed between a party selling a fixed income security and the FIT system, and a second trade can be executed between the FIT system and a party purchasing the fixed income security. In addition, the FIT system operators can commit to market liquidity for the fixed income security traded. Numerous types of fixed income securities can be traded, including investment grade, high yield corporate bonds, municipal bonds or other types of securities.

A credit checking service can also be automated and incorporated into the present invention. Financial data related to the live order can be transmitted to a credit system and approval from the credit system to process the trade can be received. In one embodiment, transmission of the financial data can be accomplished by real time trade monitoring via client web access. The credit service can provide a credit authorization for a given trade after referencing a credit limit for the client involved and calculating a level of credit extended to the client inclusive of an amount necessary to execute the order. When all appropriate input has been received, the FIT system can execute the trade. Data related to the trade can be transmitted to a settlement system.

Monitoring client access to the fixed income trading system can accomplished in real time. In this sense real time can include responses as fast as a computer system involved can process the data with no artificial delays programmed in.

One aspect of the present invention includes a method for a client to interact with a network access device in order to complete a fixed income security transaction. The network access device can be used to interact with a host computer via a communications network. The client can view graphical user interface (GUI) presented via a data stream content. The GUI can include interactive areas with offers to buy or sell a fixed income security. The network access device can be used to transmit an instruction to execute an anonymous trade relating to a specific fixed income security and receive confirmation of an executed trade relating to the specific fixed income security. A provider of the host computer can act as counterparty to the client in the trade. The client can also receive a commitment regarding market liquidity relating to the specific fixed income security.

Another aspect of the present invention includes a computer system that provides fixed income trading. A computer server can be made accessible to a network access device via a communications network. Software stored on the server and executed on demand can be operative with the server to cause the system to provide the functionality described above relating to fixed income trading.

In addition, the software can be operative to cause the system to act as counterparty to a trade responsive to a fixed income security order and/or to act as counterparty to an additional trade offsetting a live order.

The computer communications system can conform to the transmission control protocol/internet protocol or other protocol. In addition, the communications network can include a private network, or a public network, such as the Internet.

Other embodiments of the present invention include a computer executable program code residing on a computer-readable medium or a computer data signal embodied in a digital data stream.

The details of one or more embodiments of the invention are set forth in the accompanying drawings and the description below. Features, objects, and advantages of the invention will be apparent from the description, the drawings and the claims.

DETAILED DESCRIPTION

The present invention provides a method and system that enables direct trading between market participants. Market participants such as institutional investors, broker dealers and others can transact directly for the purpose of trading investment grade, high yield corporate bonds, municipal bonds or other fixed income securities. A financial institution providing a bond trading system (FIT System) can act as a counterparty to all transactions, from trade execution through settlement, and has the option to serve as a credit intermediary. The market participants are able to maintain anonymity with regard to each other. The system provides price transparency and a commitment to liquidity. Computer systems are utilized in conjunction with an electronic communications network to facilitate live execution of matched bids and offers. Software routines can direct a trader to various fixed income securities available according to specific criteria put forth by the trader.

A computer communications network is utilized to provide a vehicle for participation. A trader can use a network access device, such as a computer, to view bond auction offerings and/or market related information and present bids in a timely manner to available offerings over the network.

Figure 1:
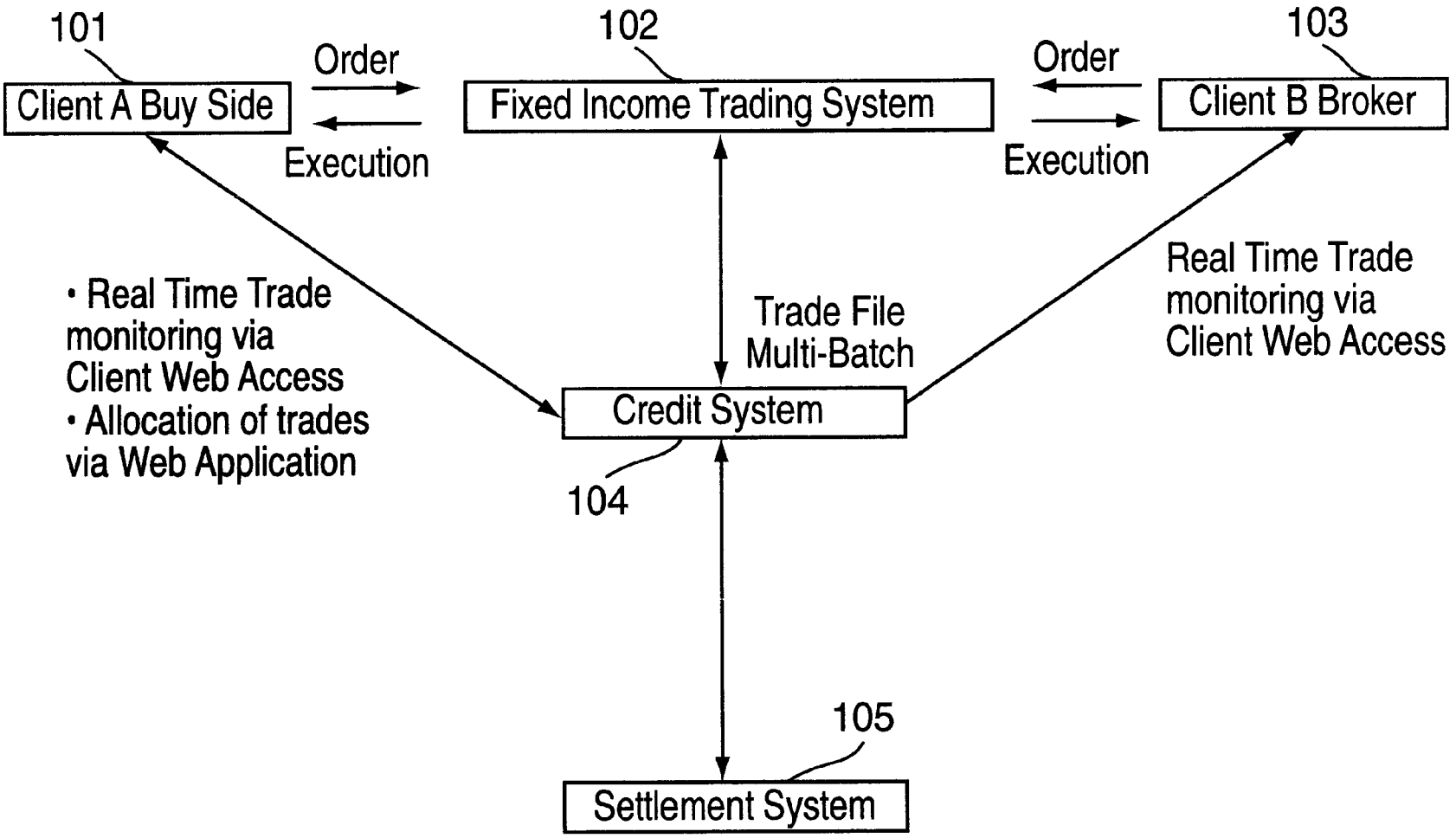
FIG. 1 illustrates a block diagram of the present invention.

Referring now to FIG. 1, a block diagram illustrates the present invention. A Fixed Income Trading (FIT) system 102 can transmit and receive orders and execution messages with a Client A Buy Side 101 and a Client B Broker 103. Both the Broker 103 and the Buy Side 101 can complete a trade while remaining anonymous to each other. The FIT system 102 acts as counterparty to both sides of a trading transaction. If desired, a Credit System 104 can monitor real time trade information via client WEB access and provide credit authorizations to the FIT system. Details relating to completed transactions can be automatically forwarded to a settlement system 105 for settlement. A trade file multi-batch can also be communicated between the FIT system 102 and the Credit System 104.

Figure 2A:
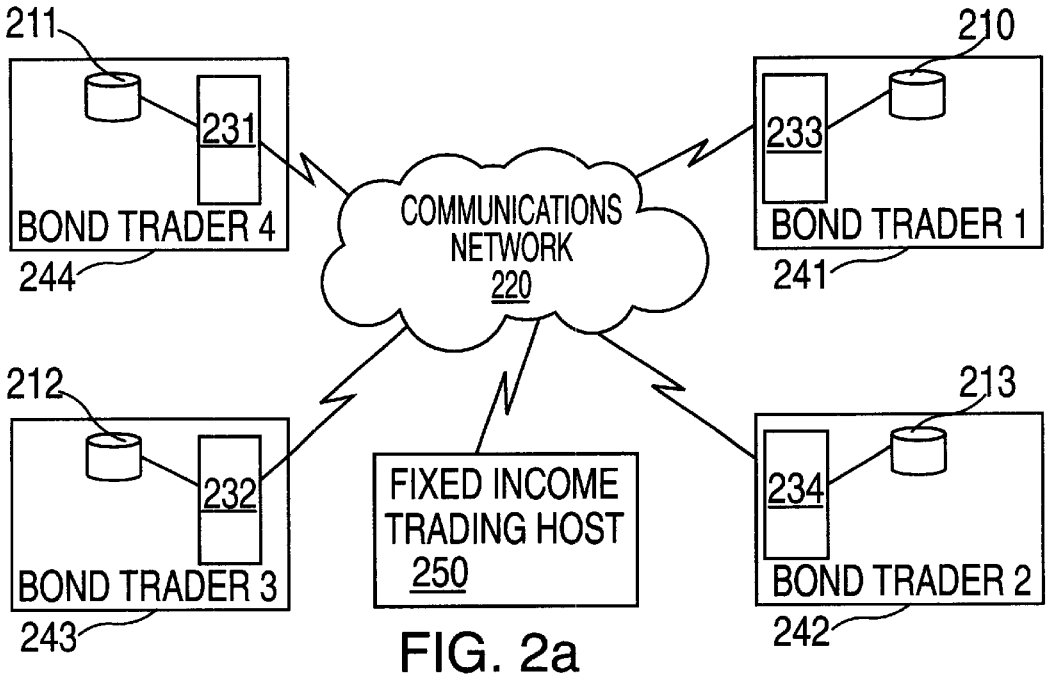
FIG. 2 illustrates exemplary components system according to the present invention.

Referring now to FIG. 2*a*, an online bond trading auction system can include a bond trading (FIT) host 250 accessible via a distributed network 220 such as the Internet, or a private network. Bond trader locations 241–244 can use a computerized system or network access device 231–234 to receive and view fixed income security information and to transmit bids to the FIT host 250.

The FIT host 250 can provide sponsor backed liquidity to fixed income securities markets and two sided markets. In addition, if it is desired, the trading host can provide sponsor backed credit intermediation. A trader can participate in complete anonymity without having to "give up" their name. Clearing and settlement can be provided via a 3$^{rd}$ party.

Figure 2B:
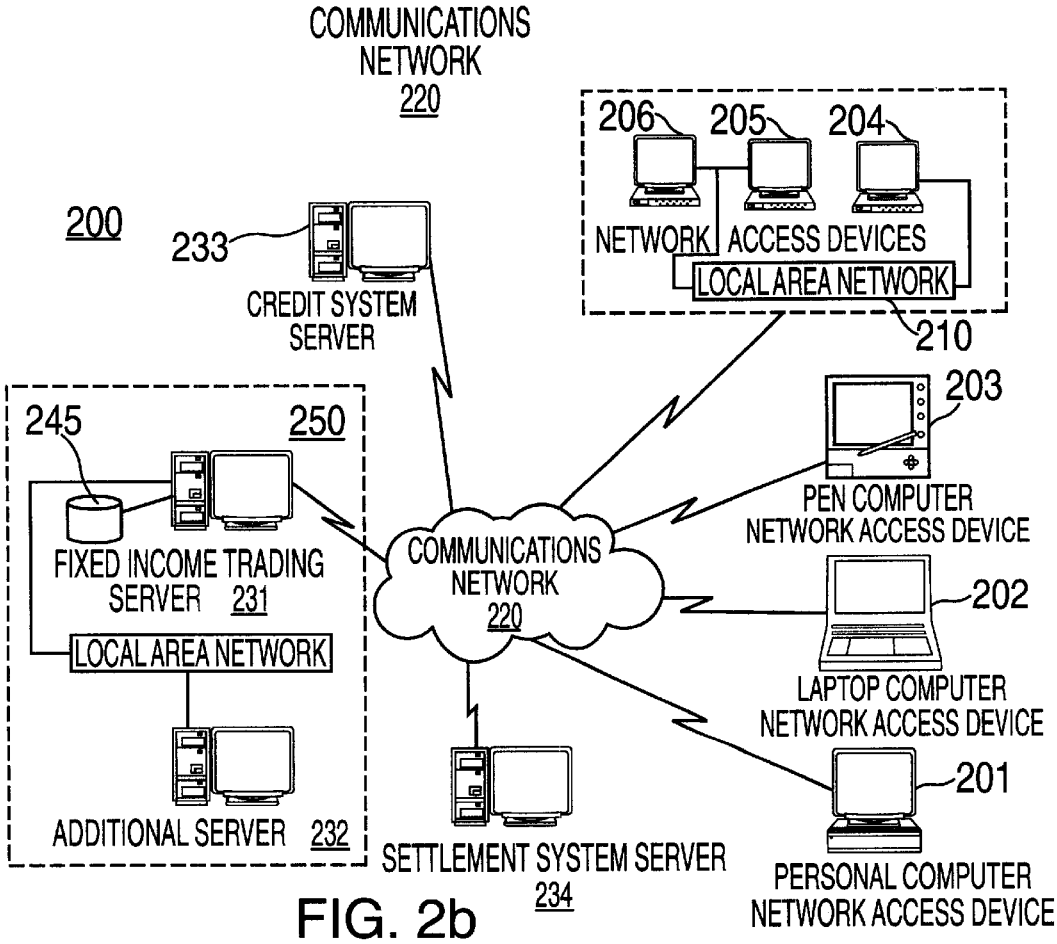

FIG. 2*b* shows a network of computers 200 that may be used in an implementation of an online bond trading auction system. The network 200 can include a FIT host system 250 and network access devices 201–206. Each of the network access devices includes a processor, memory and a user input device, such as a keyboard and/or mouse, and a user output device, such as a display screen and/or printer. The network access devices 201–206 can communicate with the FIT host 250 to obtain trading data stored at the FIT host 250. The network access device 201–206 may interact with the host computer 250 as if the host was a single entity in the network 200. However, the host 250 may include multiple processing and database sub-systems, such as cooperative or redundant processing and/or database servers 231–232, that can be geographically dispersed throughout the network 200. In some implementations, groups of network access devices 204–206 may communicate with host 250 through a local area network 210.

The host computer 250 includes one or more databases 245 storing data relating to bond trading. Trading data can include for example, price, quantity, maturity date, and any other information pertaining to the trading activities. In one embodiment, the database 245 can also include client information and credit information relating to the clients. The host 250 may interact with and/or gather data from a trader who is operating a network access device 201–206. Data gathered from the trader may be used to conduct trading or provide information to the trader.

Typically a trader will access the FIT host 250 using client software executed at the trader's network access device 201–206. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the FIT host 250 to the client computer and executed at the client computer as part of the live auction software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Interaction with the trading host can provide real time display of live orders. Order entry can be accomplished by spread, real time U.S. treasury price, or price on yield. The host 250 will effect automated matching of orders and provide full book display for all issues with markets. In addition, a trade and order history can be made available via a library.

In one embodiment, the FIT system can provide multiple order matching wherein the system matches multiple orders with the same price, even if there is a reserve order. The FIT system can execute an amount of a reserve order, and also any other orders at that price. The FIT system can then treat any remaining reserve order as a new order at that price. In another aspect of the FIT system, a participant will have the ability to hide a portion of their order with a plus sign showing on the screen to indicate a reserve order. A participant will also have the ability to sweep orders. Sweeping can be accomplished with or without treasury hedges of a duration neutral quantity.

The FIT system will operate in real time and thereby have the ability to post trades as they are consummated. If desired, the trade information can then be immediately forwarded to interested parties for confirmation and record keeping. Summary reports can also be compiled and distributed at predetermined time intervals, or upon request.

Additional services, such as trade settlement and credit verification can be provided over the network 220 via servers such as a settlement server 234 or a credit system server 233.

Figure 3:
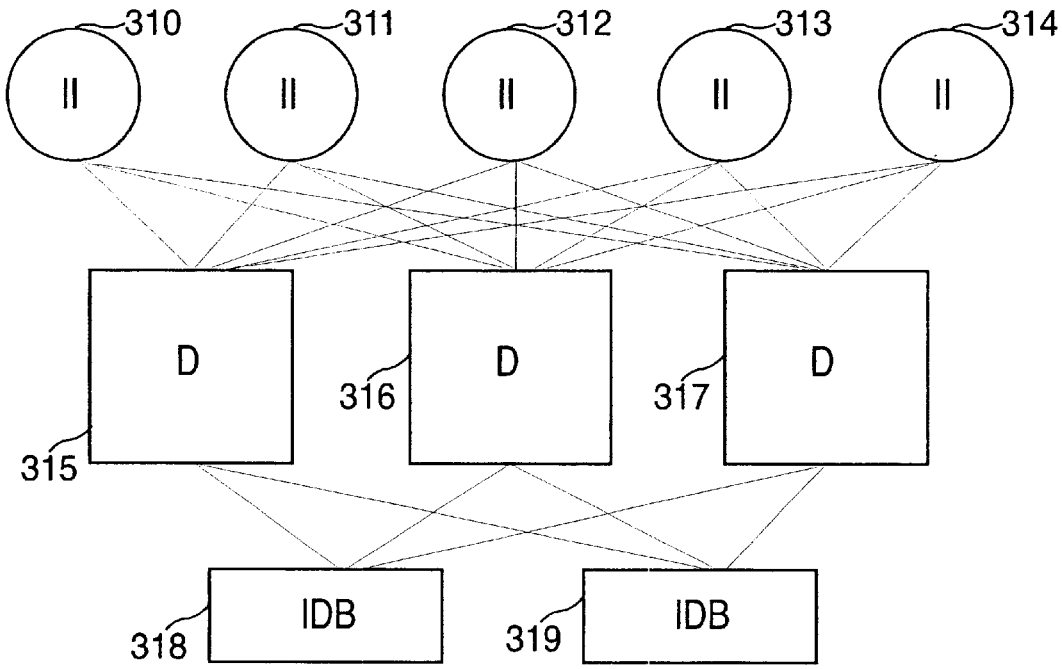
FIG. 3 PRIOR ART
FIG. 3 illustrates a block diagram of a prior art secondary debt market.

Referring now to FIG. 3, traditionally in the secondary debt market, institutional investors 310–314 were limited to interactions with a dealer 315–317. Likewise, a dealer 315–317 would only interact with an inter dealer broker 318–319. Under this scenario, the dealers 315–317 could not interact directly with another dealer 315–317.

Figure 4:
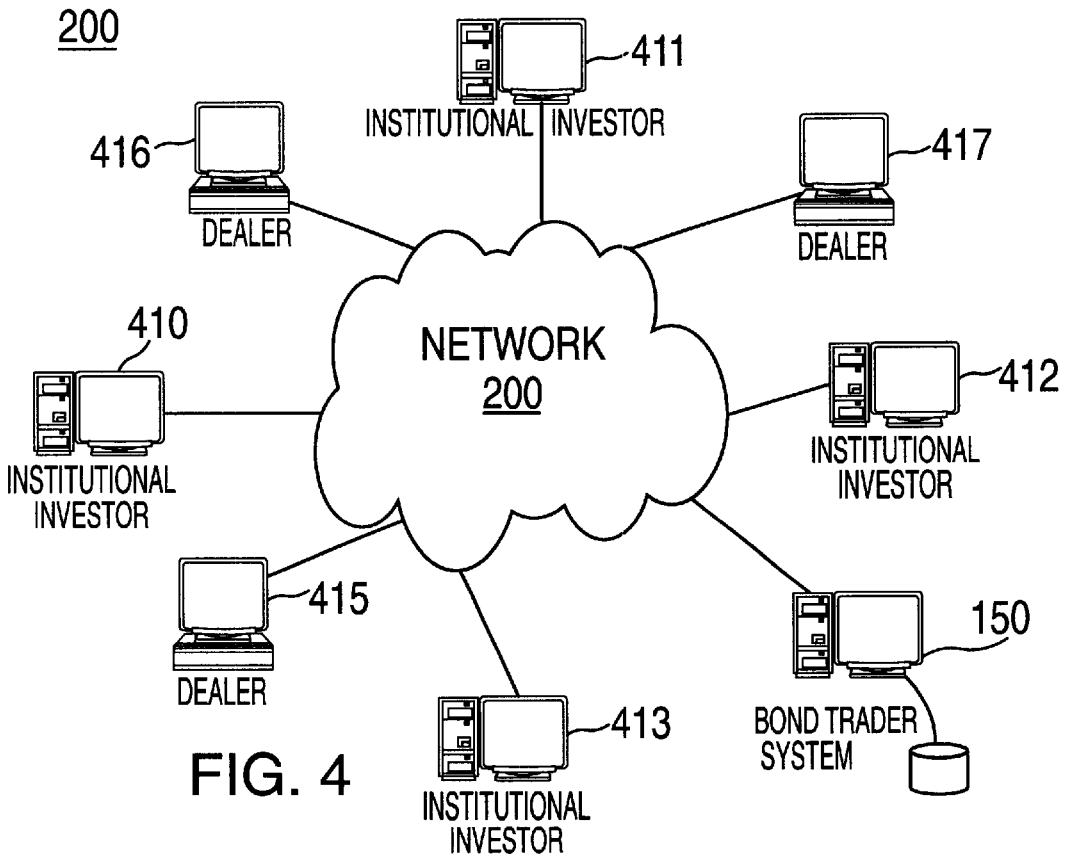
FIG. 4 illustrates components included in a secondary debt market according to the present invention and the corresponding structure.

Referring now to FIG. 4, the current invention provides for a FIT System 400 to service the secondary debt market wherein institutional investors 310–313 and dealers 315–317 interact directly with the automated eBond trading system 410. Essentially, the role of the inter dealer broker 318–319 has been eliminated. Additionally, dealers 315–317 and institutional investors 310–313 can anonymously trade via the automated FIT System 410. The hierarchy of the system illustrated in FIG. 3 has generally been replaced with a structure in which, any market participant acting as a trader, including the dealers 315–317 and institutional investors 310–313, can consummate a trade with each other on the secondary debt market.

Figure 5:
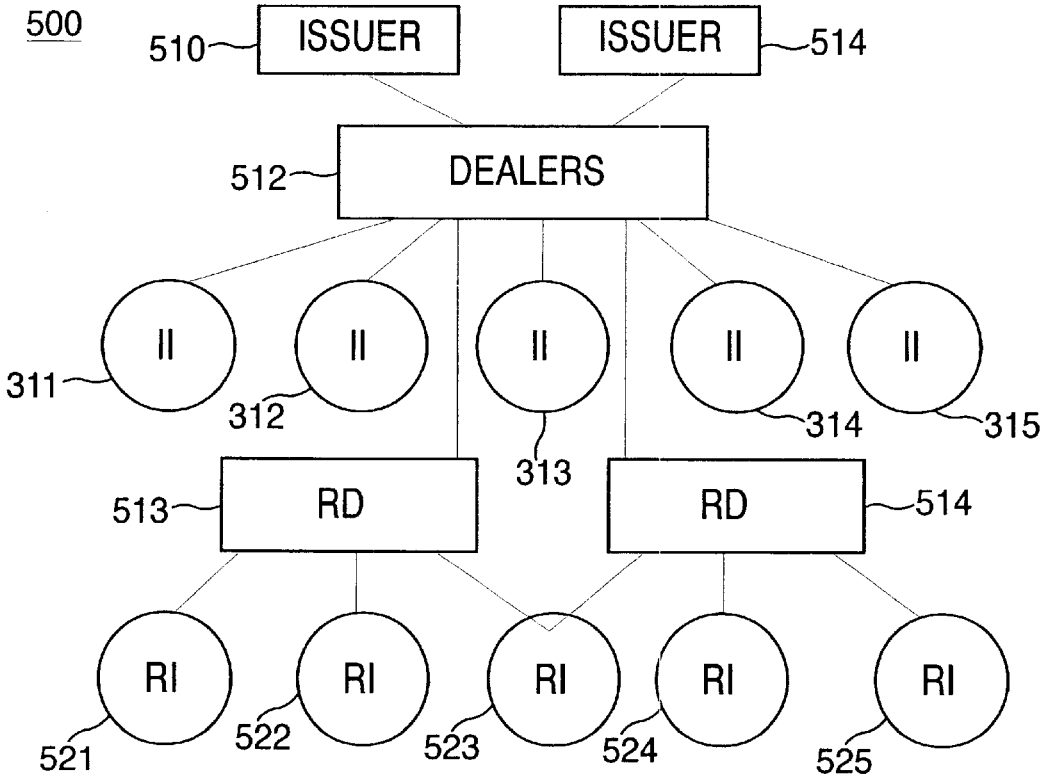
FIG. 5 PRIOR ART
FIG. 5 illustrates a block diagram of a prior art new issue market.
Figure 6:
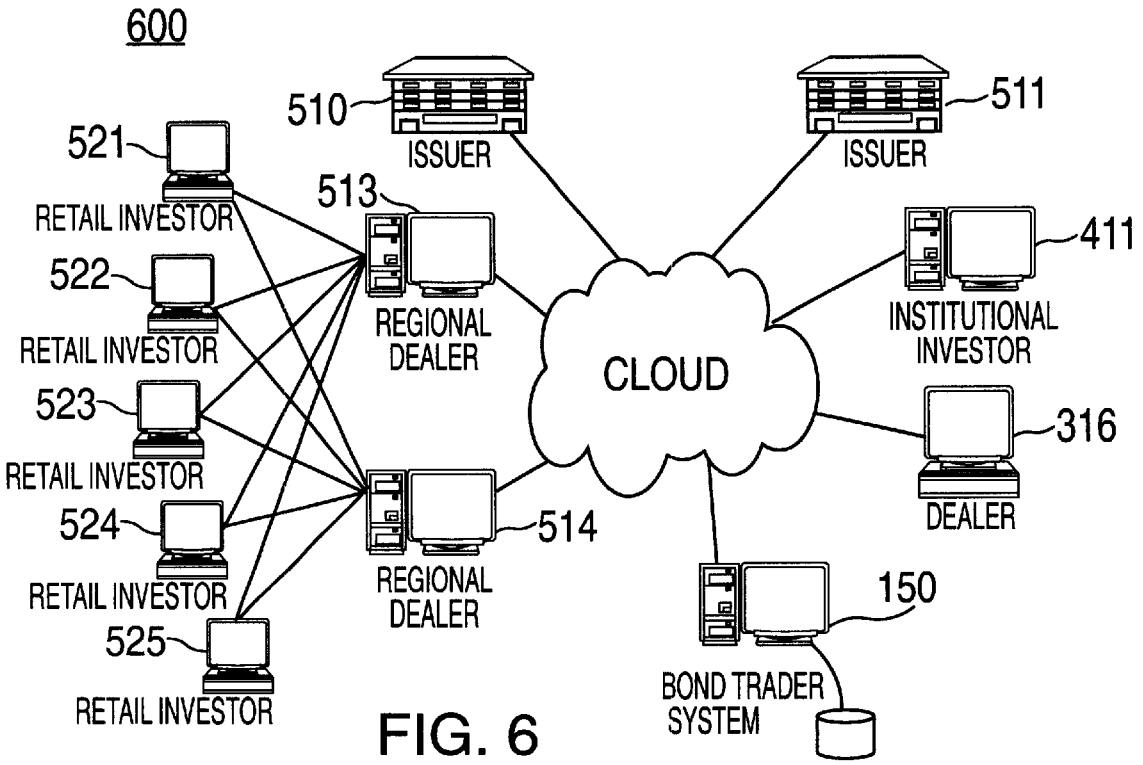
FIG. 6 illustrates components included in a new issue market according to the present invention and the corresponding structure.

Referring now to FIG. 5, the traditional primary new issue market 500 included issuers 510–511 which interacted with dealers 512. The dealers in turn can interact with institutional investors 311–315 or regional dealers 513–514. Regional dealers 513–514 in turn would interact with retail investors 521–525. The current invention as depicted in FIG. 6, includes an automated FIT System 600 directed towards the primary new issue market. Issuers 510–511 can interact with an automated FIT System 410 to complete an anonymous transaction directly with other traders. Other traders can include institutional investors 310–311, dealers 315–316 or regional dealers 513 wherein these other traders can also deal anonymously with the automated FIT System. A retail investor 521–525 can still interact with a regional dealer 513–514 under the more efficient scenario that allows the regional dealers 513–514 to circumvent the need to operate through a dealer 315316. Under the present invention, the regional dealer 513–514 can deal directly with the automated FIT System 410 to complete transactions with an issuer 510–511.

Figure 7:
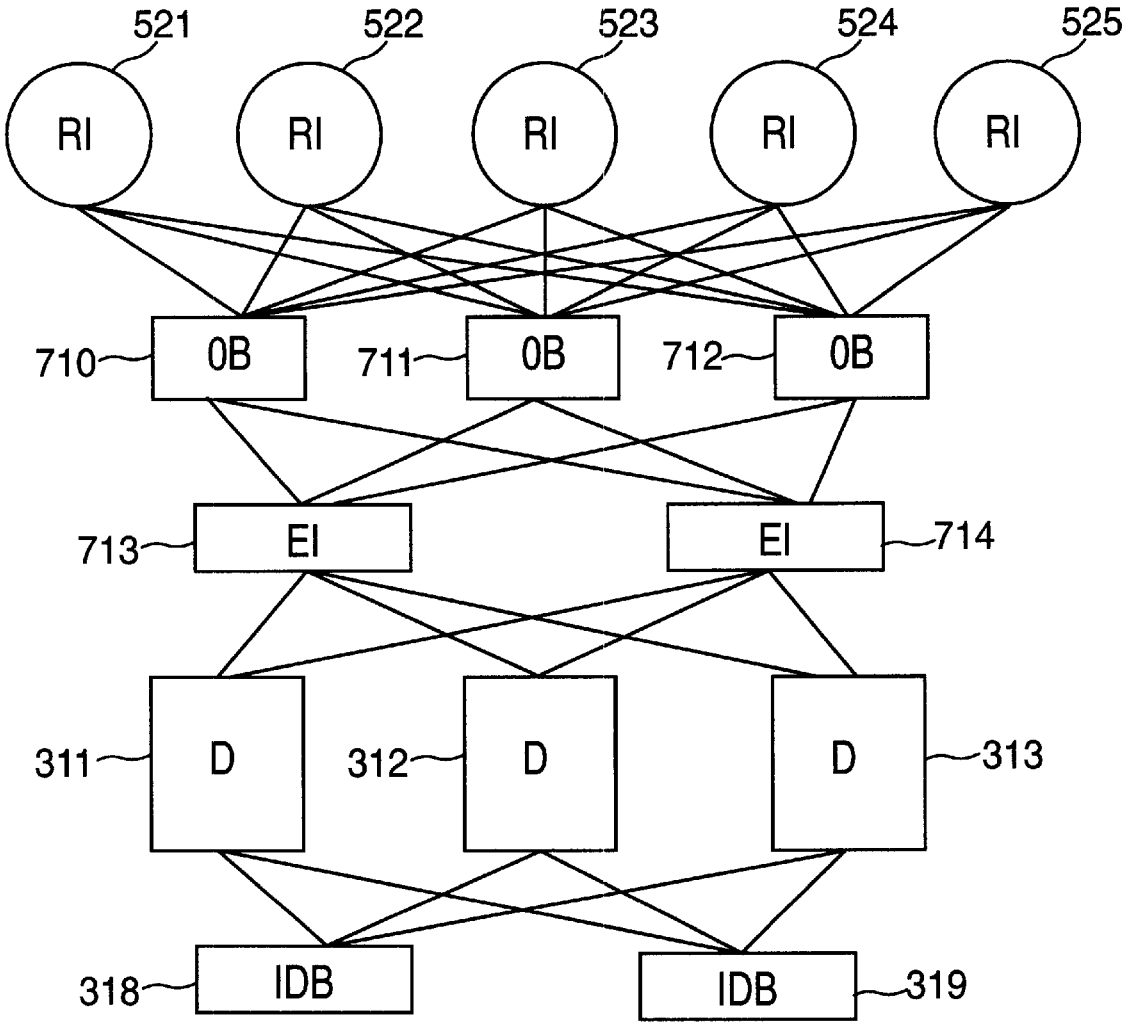
FIG. 7 PRIOR ART
FIG. 7 illustrates a block diagram of a prior art retail market.

Referring now to FIG. 7, a prior art, trading scenario for online brokers is illustrated in a block diagram. As seen in the diagram, retail investors 521–525 can interact with an online broker 710–712. In turn, the online broker 710–712 will interact with an electronic intermediary 713–714. The dealers 311–313 also interact with the electronic intermediary 713–714. In turn, the dealers 311–313 will interact with an inter dealer broker 318–319. This system is based upon a hierarchy of levels. Each level being limited to interactions with the level directly above or directly below.

Figure 8:
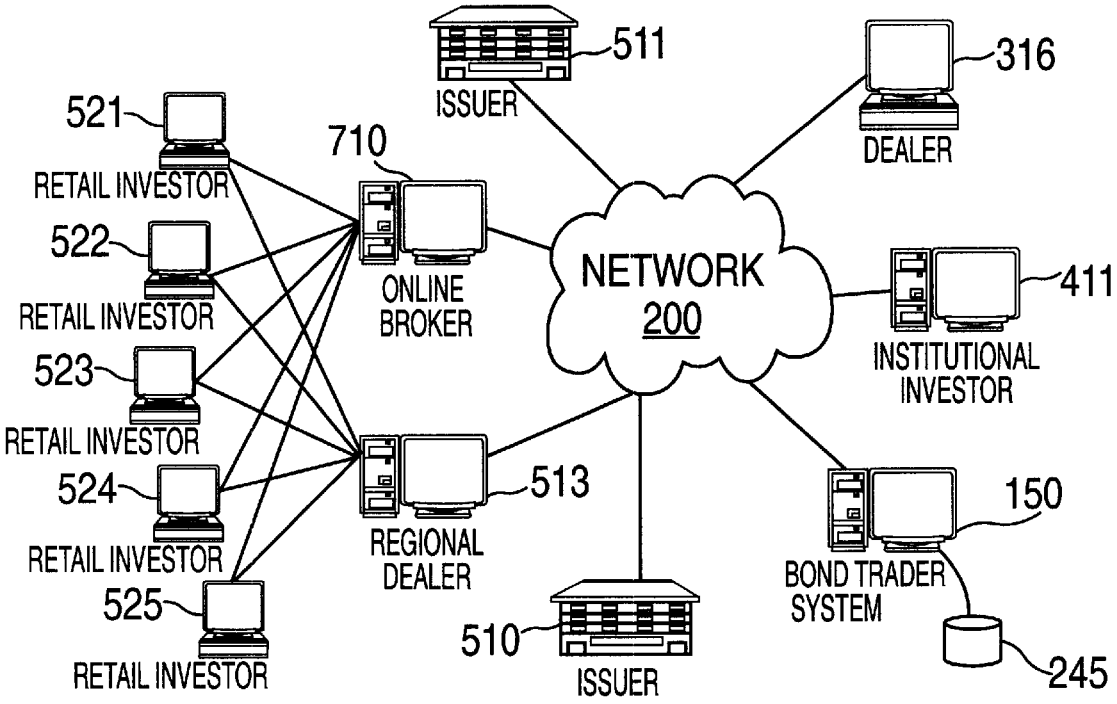
FIG. 8 illustrates components included in a retail market according to the present invention and the corresponding structure.

As depicted in FIG. 8, the current invention teaches a system wherein a retail investor 521–525 can interact directly with either a regional dealer 513 or an online broker 710. In turn, commercial traders including the online broker 710, the regional dealer 513, an issuer 510–511, an institutional investor 310–311 or a dealer 315–316 can complete anonymous transactions through the automated FIT System 510. The automated FIT System 510 provides market efficiency by eliminating trading hierarchies and facilitating direct interaction between all market participants.

Market liquidity can be accomplished through commitments from sponsors to provide sufficient liquidity necessary to create a real market for credit and spread products. The sponsors commitment can ensure a critical mass trade volume and live markets as well as markets to secondary trading of new issues by the sponsors. Dealer shareholders, or other sponsors can commit to minimum market making and trading volume. For example, each dealer shareholder can agree to make either a one-sided or a two-sided market trading day in a certain number of issues relating to secondary trading in high grade corporate bonds, high yield bonds and municipals. In addition, with respect to high grade corporate bonds and high yield bonds, each dealer shareholder can agree to certain trading volume commitments for a predetermined time period, such as annual, monthly or daily.

In order to appropriately respond to changes related to liquidity needs associated with the fixed income trading system, market making and trading volume commitments can be reviewed and renegotiated, extended, or amended. In one embodiment an initial commitment to market liquidity can be phased out as the average trading volume on the FIT system reaches an appropriate level necessary to support efficient functionality.

Functionality utilized to implement a FIT System can be represented in interactive graphic user interfaces (GUI) and presented upon network access devices. Implementation of the FIT System can include functions that facilitate trading and the presentation of information conducive to trading, as well as functions directed to quantifying market participants and monitoring the status of participants' credit.

Specific embodiments of the present invention can include various features and functionality. The following sections discuss such features and functions which can facilitate an online FIT system, however, the these descriptions are not meant to limit the scope of the invention.

Figures 9, 9A:
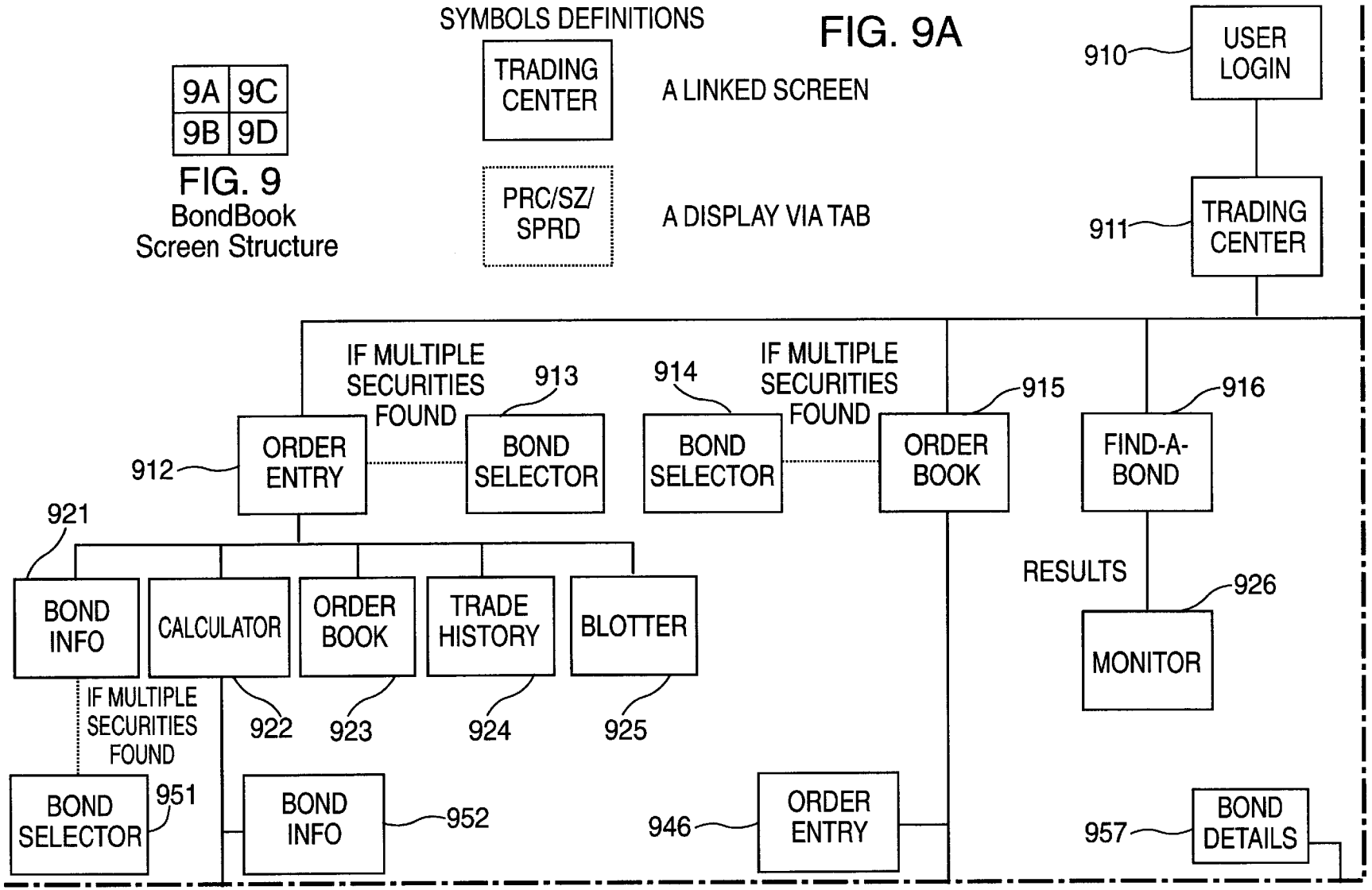
FIG. 9 illustrates a trading center GUI.
Figure 9B:
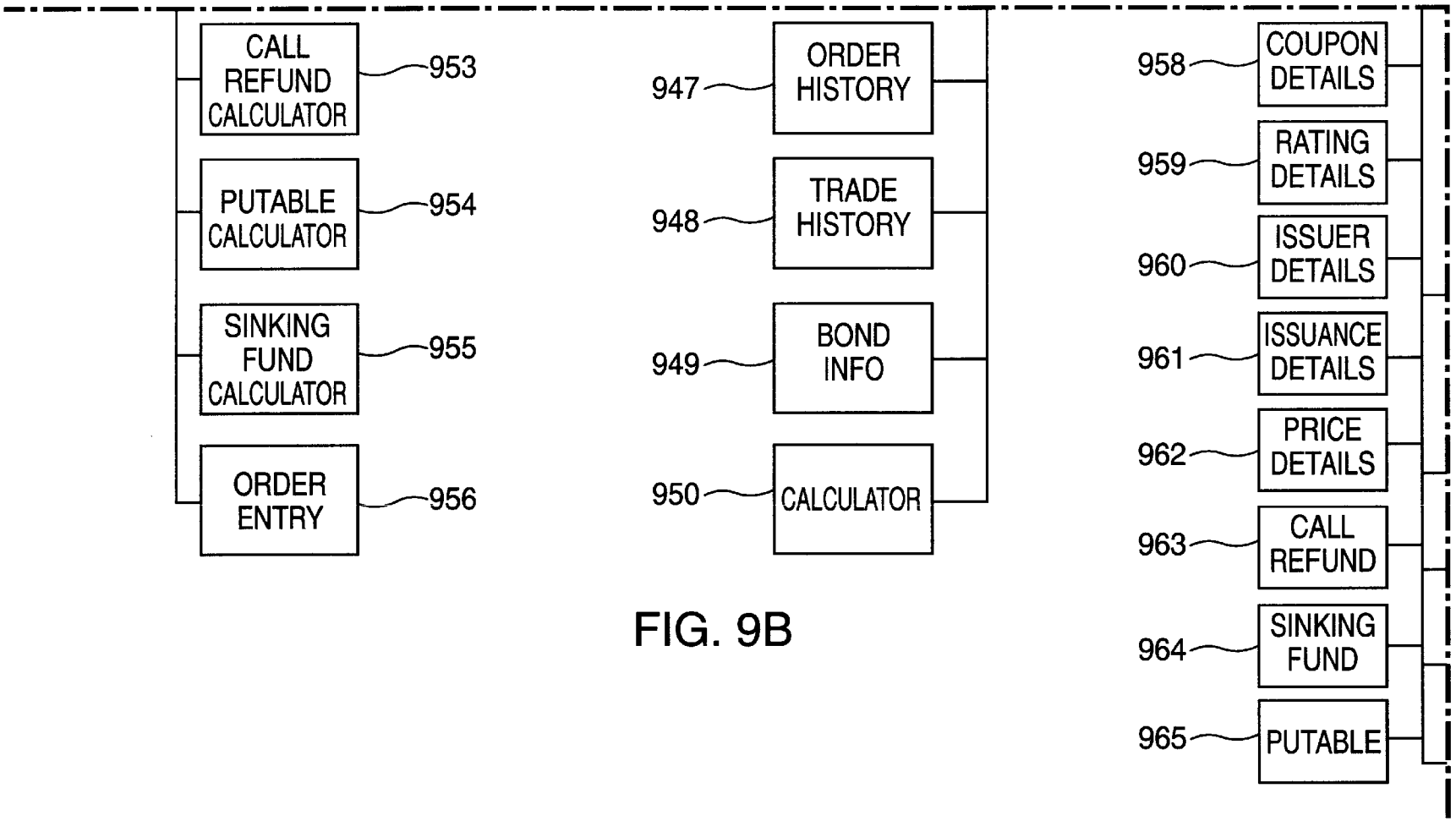
Figure 9C:
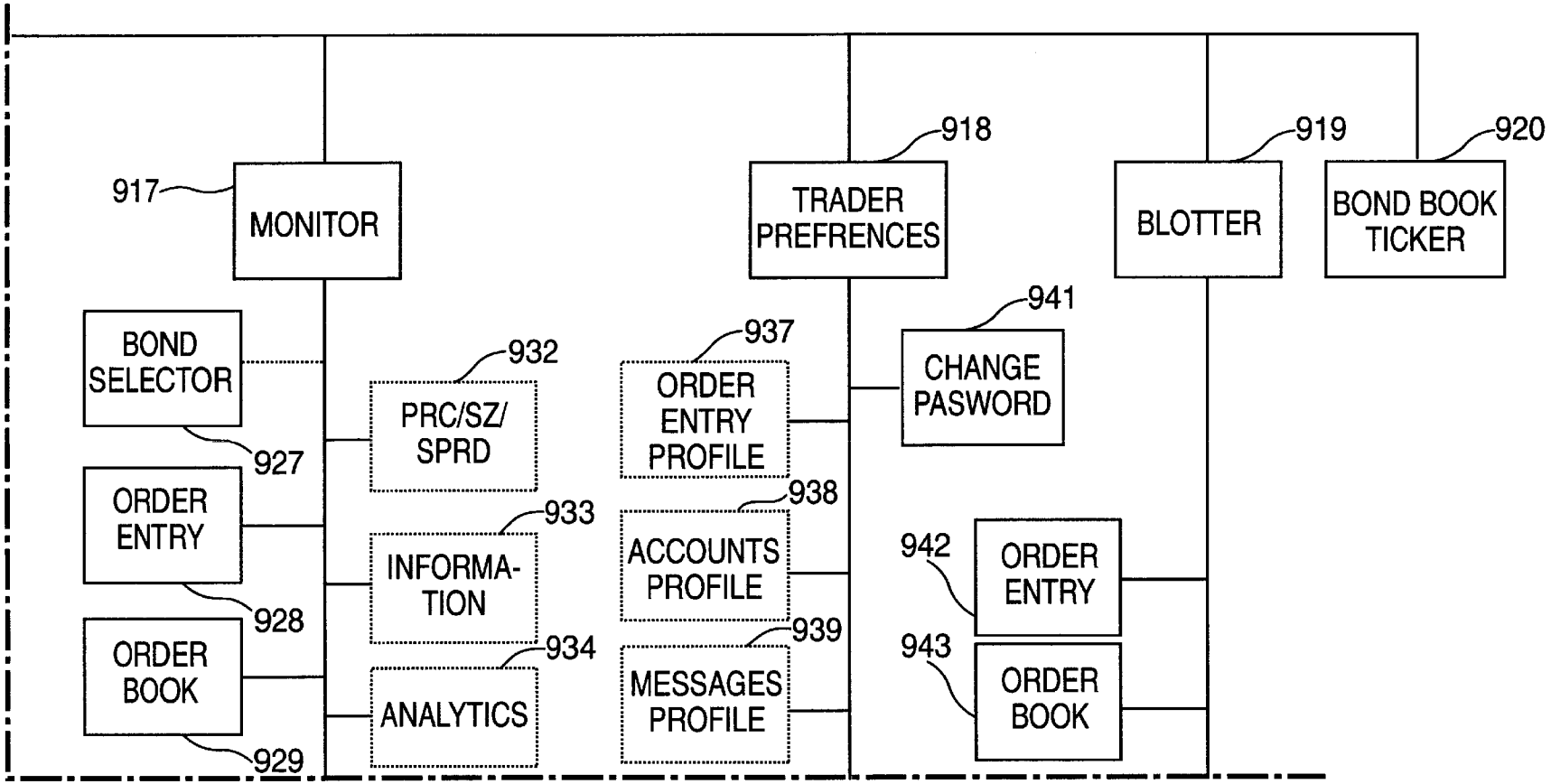
Figure 9D:
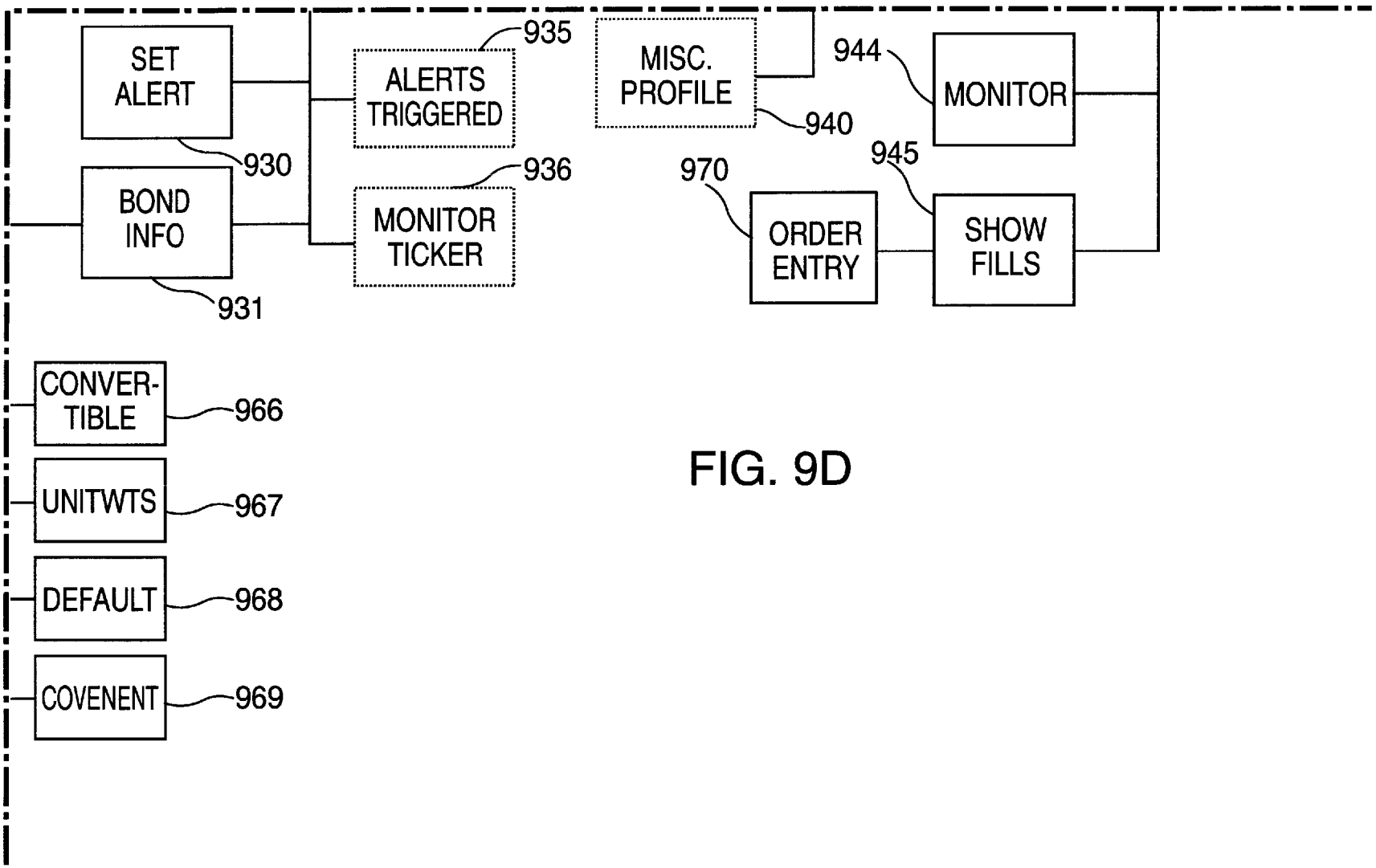

Referring now to FIG. 9, a graphical user interface (GUI) can be used to present numerous features and functions to a user. The FIT system can include an interface that allows a user to choose a monitor function, a blotter function, a ticker function, a trader profile function, a find the bond function, and other features that may be useful on a main menu of a FIT system.

A trading center (911) menu can include user interactive devices to proceed onto: an order entry menu (912), an order book (915), to find-a-bond (916), to monitor (917), to trader preferences (918), to blotter (919), or to ticker (920) menus.

An order entry menu GUI can include additional user interactive devices, for example, to link to: a bond selector (913), a bond information (921), a calculator (922), an order book (923), a trade history (924), or a blotter (925) menu. If multiple securities are found under a bond information menu, the user can be directed to a bond selector menu (951).

A calculator GUI can allow a user to proceed to a bond information (952), a call refund calculator (953), a putable calculator (954), a sinking fund calculator (955), or an order entry (956) menu. An order book (915) menu can allow a user to proceed to a bond selector (914), order entry (946), order history (947), trade history (948), bond information (949), or calculator (950) menu. A bond menu (916) can direct a user to a monitor menu (926).

A monitor menu (917), can include interactive devices to proceed to functions including: a bond selector (927), order entry (928), Prc/SZ/spread (932), information (933), order book (929), analytics (934), set alert (930), alerts triggered (935), monitor ticker (936), or bond information (931) menu. The bond information menu (931) can include links to access information on bond details (957), coupon details (958), rating details (959), issuer details (960), issuance details (961), price details (962), convertible (966), call refund (965), unit/WTS (967), sinking fund (964), default (968), putable (965), or covenant (969) menus.

A trader preferences menu (918) can include interactive devices to proceed to change a password (941), an order entry profile (937), an accounts profile (938), a messages profile (939), or miscellaneous profile (940) menu.

A blotter menu (919) can include interactive devices to proceed to order entry (842), order book (943), monitor (944), or show fills (945) menus. Show fills (945) can include an additional link to an order entry menu (970).

Figure 10:
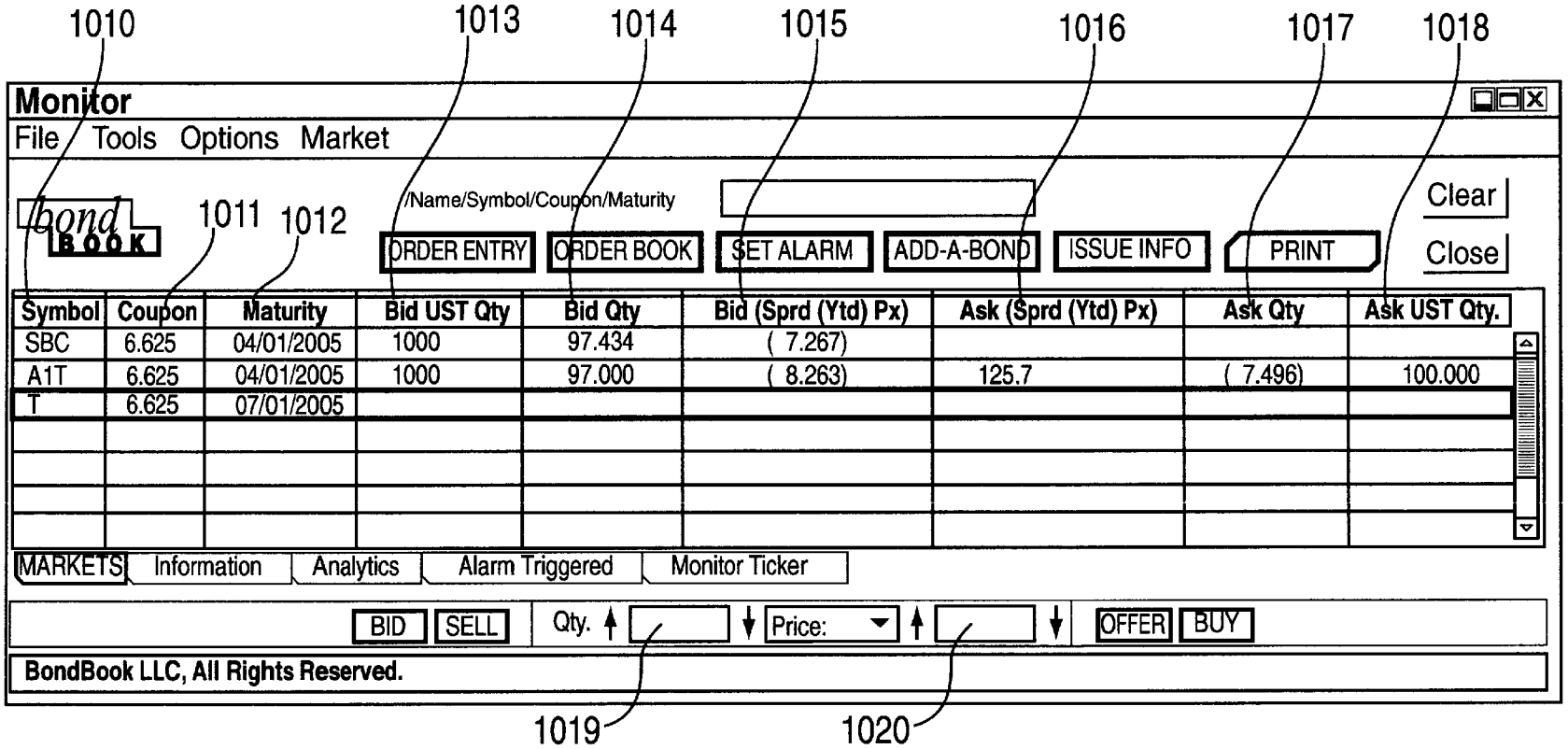
FIG. 10 illustrates an exemplary interface that might be used with a monitor function.

FIG. 10 shows an exemplary interface that might be used with a monitor function. A monitor function can include graphical user interface menus for symbol (1010), coupon (1011), maturity (1012), bid UST quantity (1013), bid quantity (1014), bid (spread (yield) Px) (1015), ask (spread (yield) Px) (1016), ask quantity (1017), and ask UST quantity (1018). The monitor function can also include quantity (1019) and price (1020) GUIs.

Figure 11:
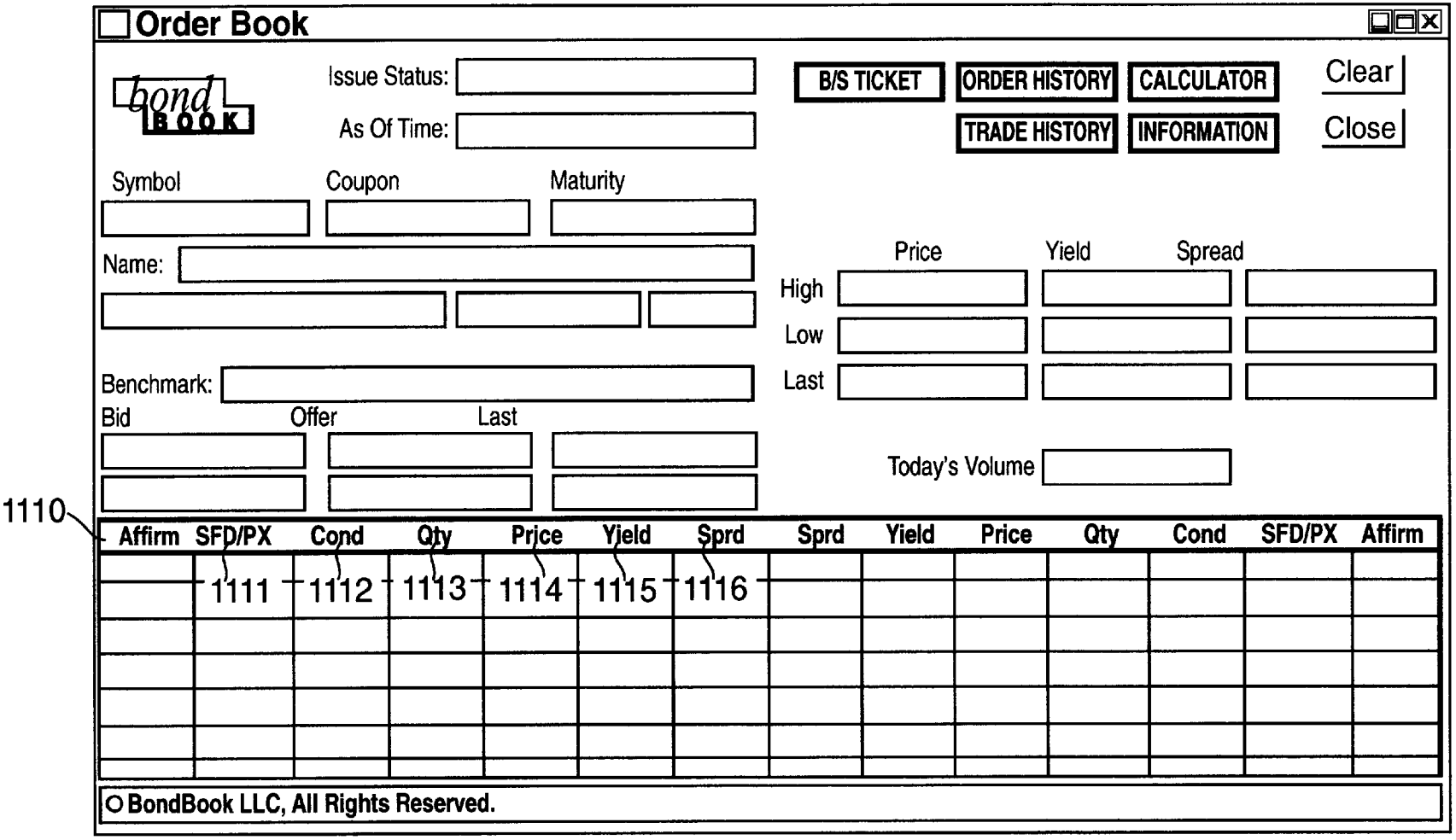
FIG. 11 illustrates input fields.

FIG. 11 illustrates input fields as well as information fields that can be displayed relating to an order book GUI. An order book GUI can also include user-interactive devices to launch a B/S ticket, an order history, a calculator, a trade history, or other information, as well as user interactive devices to clear a screen or to close the screen. Input fields as well as information fields can be displayed relating to an order book GUI. An order book GUI can also include menus that show whether a bond order was affirmed (1110), as well as related spd/px (1111), condition (1112), quantity (1113), price (1114), yield (1115) and spread (1116) functions.

Figure 12:
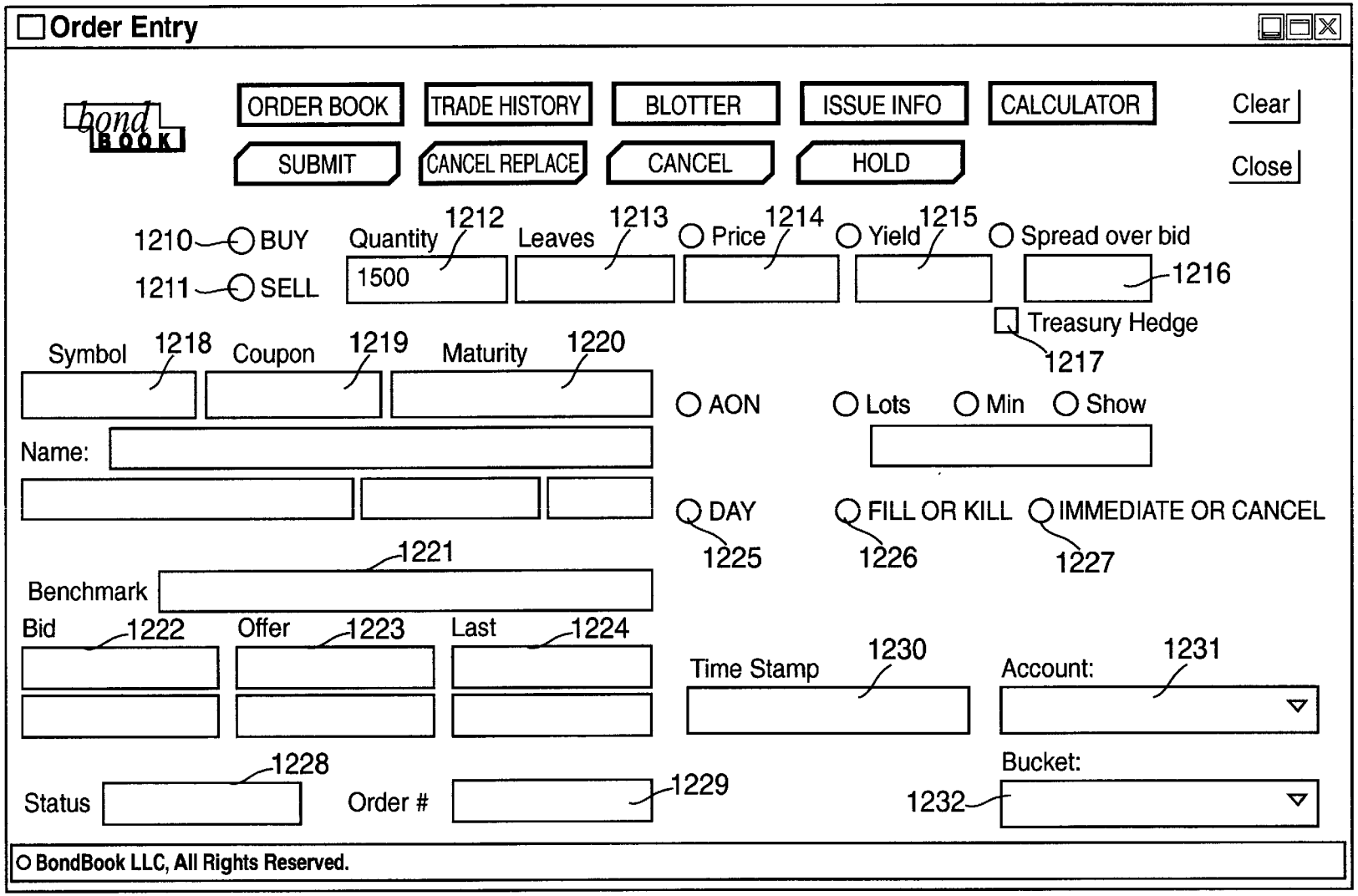
FIG. 12 illustrates an exemplary order entry screen.

FIG. 12 illustrates an exemplary order entry screen with numerous field entry positions, as well as functional user interactive buttons. Input fields as well as information fields can be displayed relating to an order entry GUI. More specifically, the order entry GUI contains menus for buy (1210), sell (1211), quantity (1212), leaves (1213), price (1214), yield (1215), spread over bid (1216), symbol (1218), coupon (1219), maturity (1220), treasury hedge (1217), benchmark (1221), bid (1222), offer (1223), last (1224), day (1225), fill or kill (1226), immediate or cancel (1227), status (1228), order number (1229), timestamp (1230), account (1231), and bucket (1232).

Figure 13:
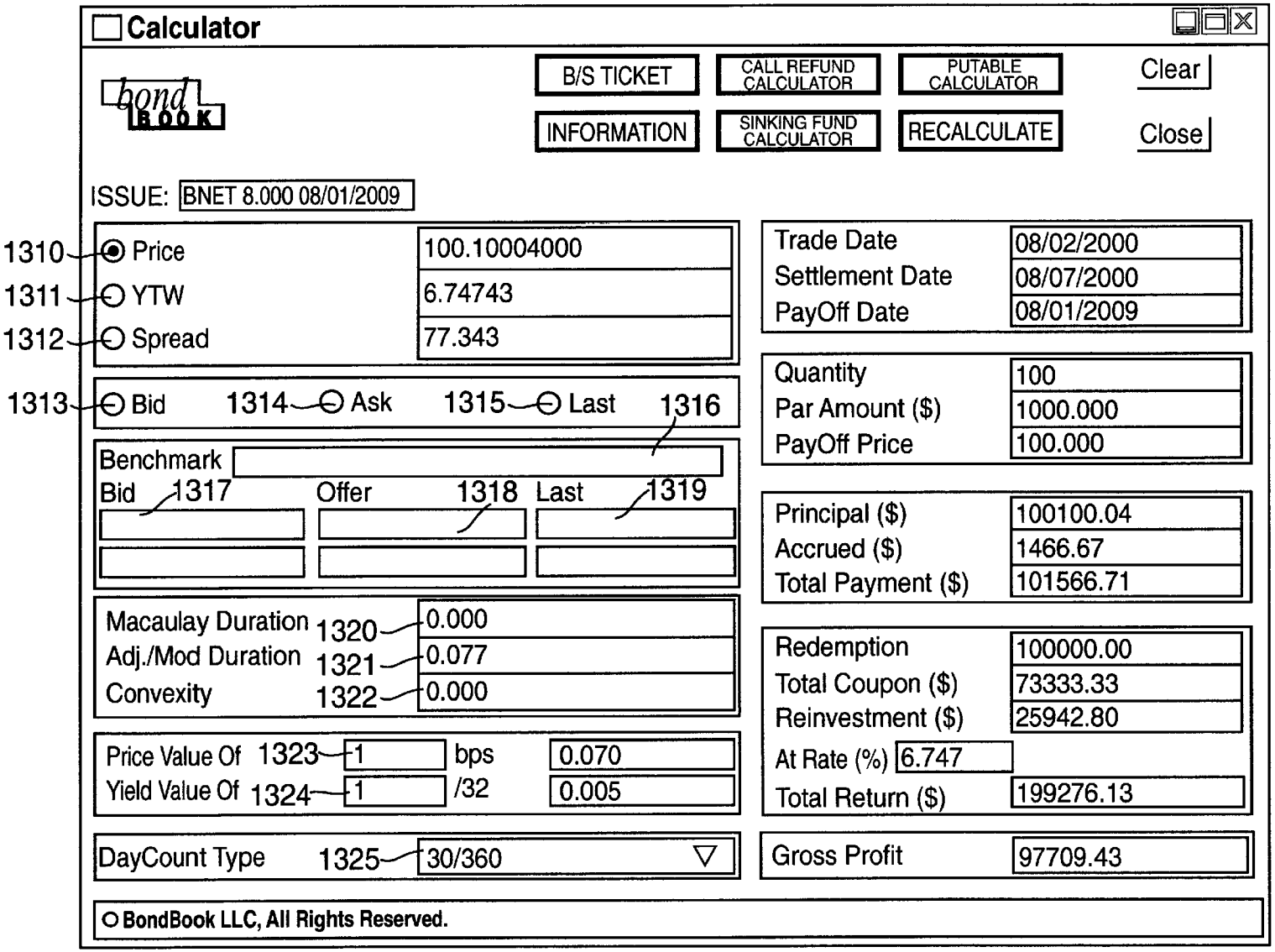
FIG. 13 illustrates an online bond calculator.

FIG. 13 illustrates an online bond calculator that can be displayed in a separate window to help a trader with calculations related to bond trading. A calculator GUI can contain menus for price (1310), ytw (1311), spread (1312), bid (1313), ask (1314), last (1315), benchmark (1316), bid (1317), offer (1318), last (1319), Macaulay duration (1320), adj/mod duration (1321), convexity (1322), price value of (1323), yield value of (1324), and daycount type (1325).

Figure 14:
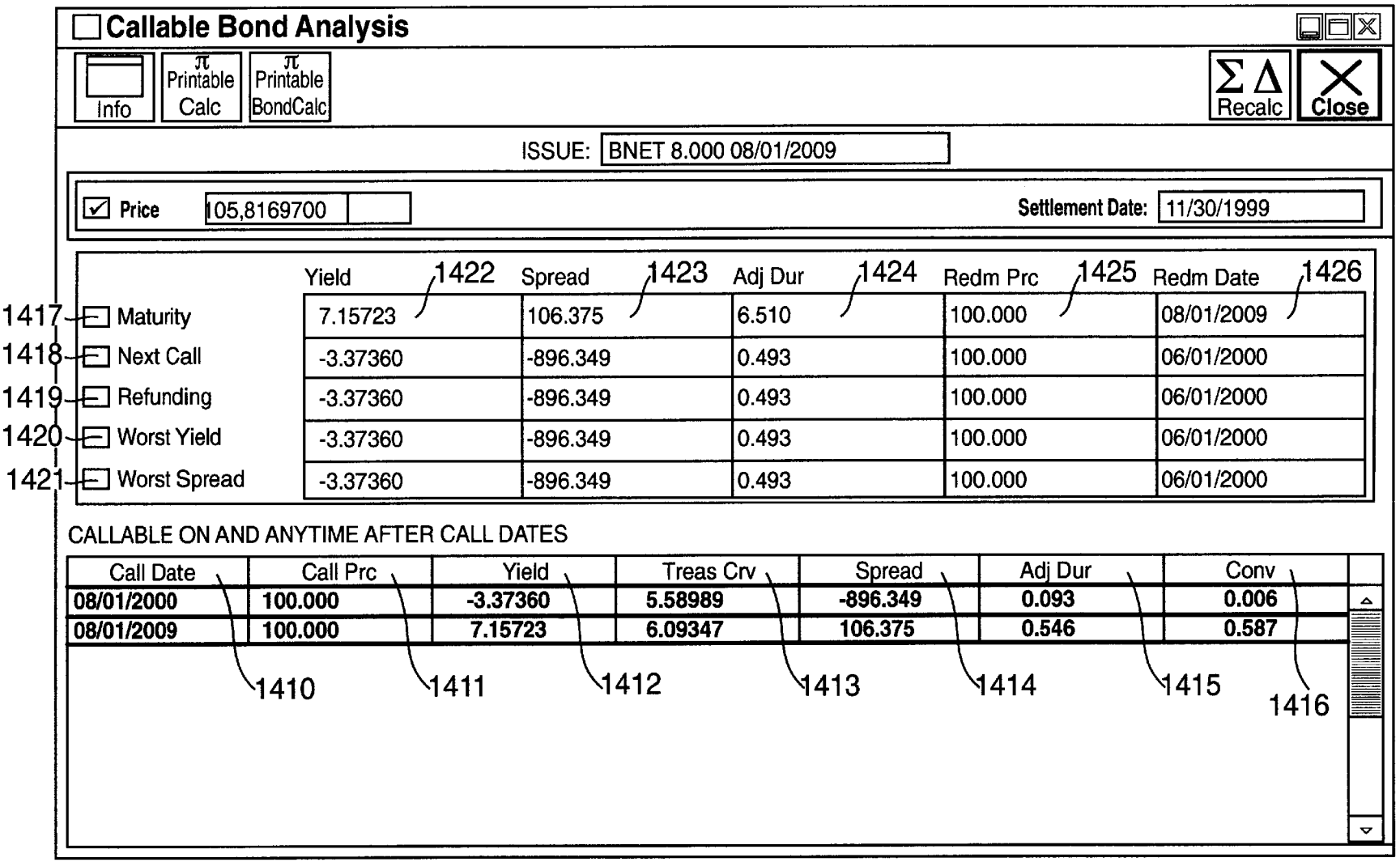
FIG. 14 illustrates a GUI dedicated to callable bond analysis.

FIG. 14 illustrates a GUI dedicated to callable bond analysis. A callable bond analysis GUI can contain menus for call date (1410), call price (1411), yield (1412), treasury crv (1413), spread (1414), adjusted duration (1415), conversion (1416), maturity (1417), next call (1418), refunding (1419), worst yield (1420), worst spread (1421), yield (1422), spread (1423), adjusted duration (1424), redemption price (1425), and redemption date (1426).

Figure 15:
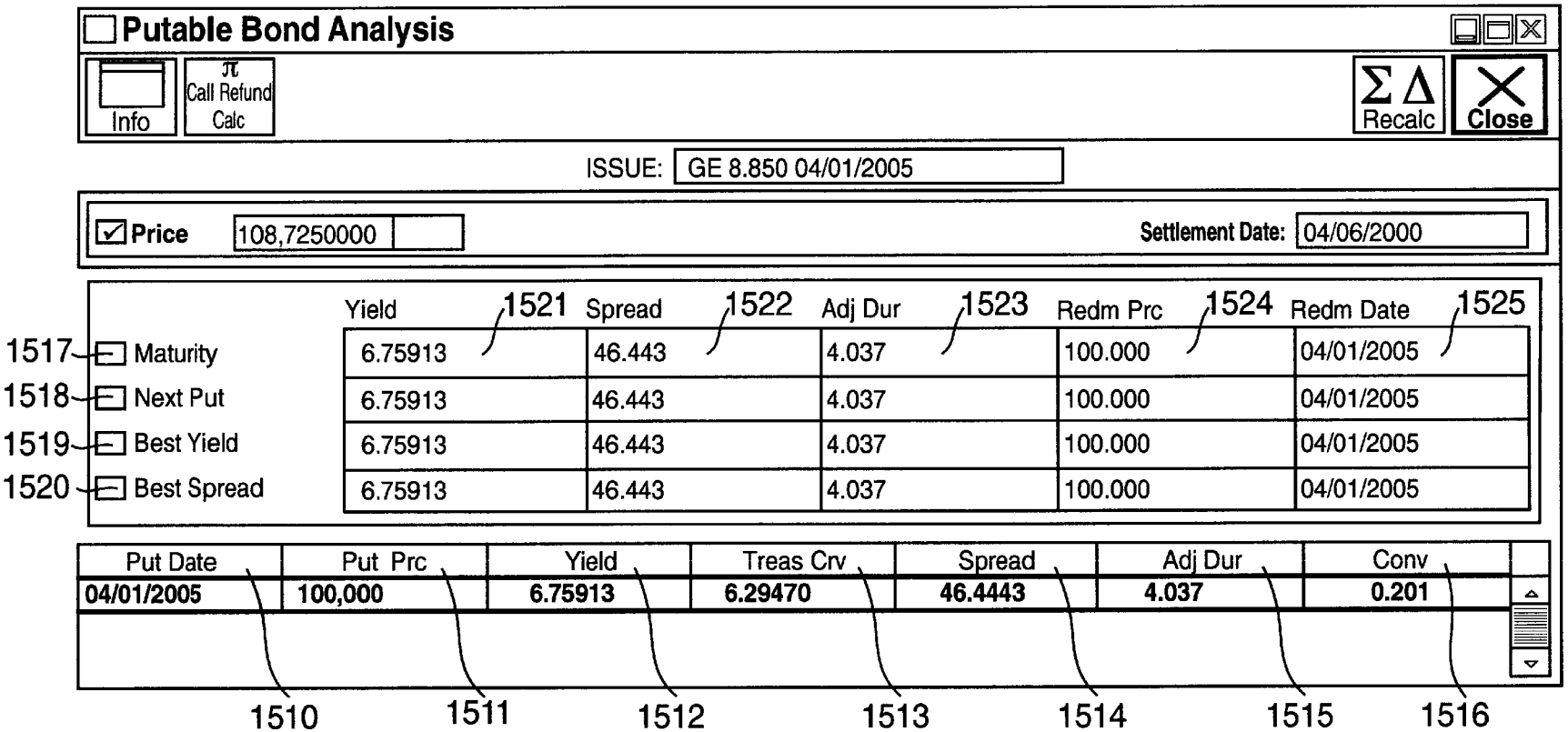
FIG. 15 illustrates a GUI relating to Putable bond analysis.

FIG. 15 illustrates a GUI relating to Putable bond analysis. A putable bond analysis GUI can contain menus for put date (1510), put price (1511), yield (1512), treasury crv (1513), spread (1514), adjusted duration (1515), conversion (1516), maturity (1517), next put (1518), best yield (1519), best spread (1520), yield (1521), spread (1522), adjusted duration (1523), redemption price (1524), and redemption date (1525).

Figure 16:
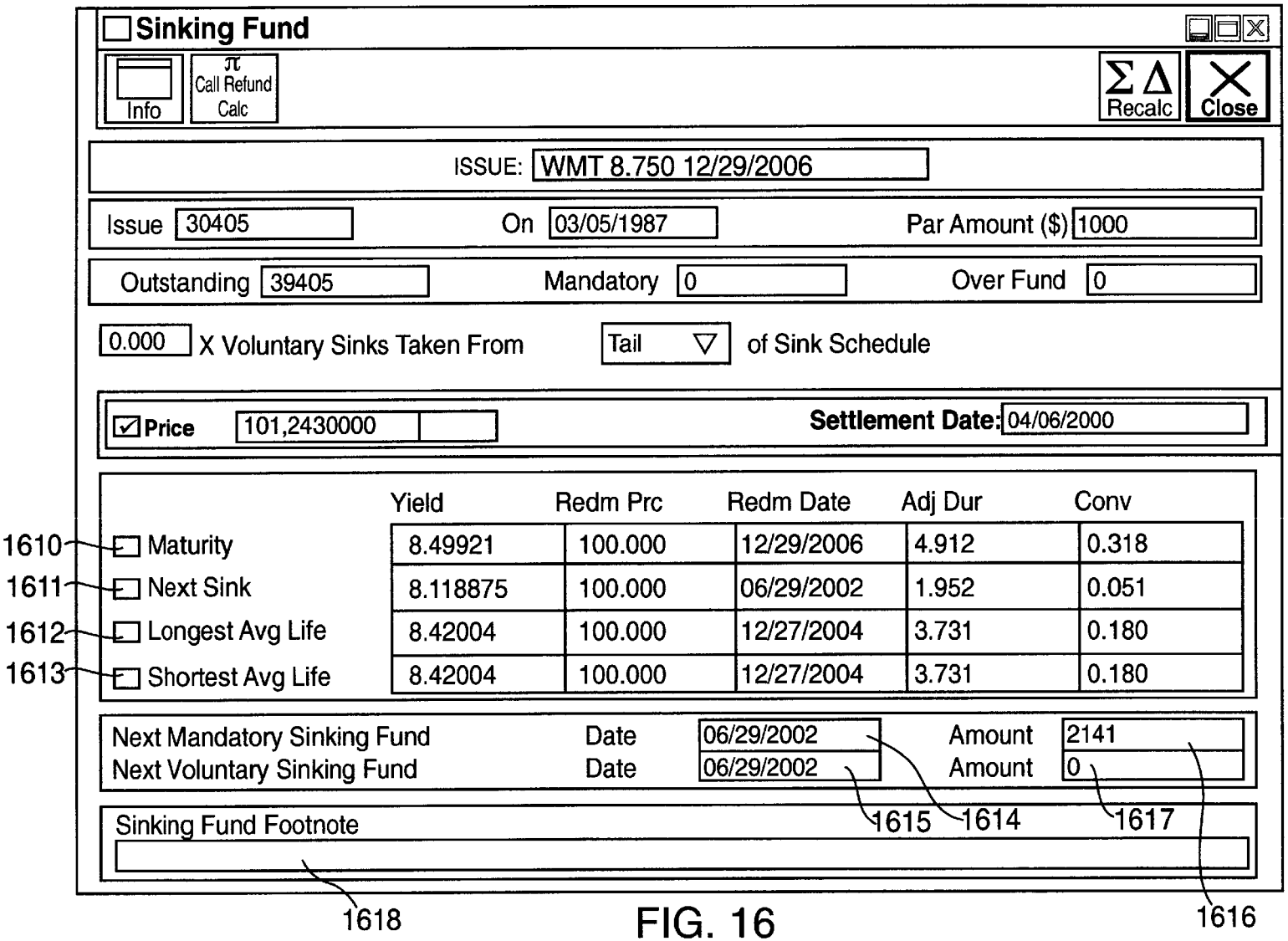
FIG. 16 illustrates a GUI relating to sinking fund analysis.

FIG. 16 illustrates a GUI relating to sinking fund analysis. A sinking fund analysis GUI can contain menus for maturity (1610), next sink (1611), longest average life (1612), shortest average life (1613), next mandatory sinking fund date (1614), next voluntary sinking fund date (1615), amount for next mandatory sinking fund date (1616), amount for next voluntary sinking fund date (1617), and a section for sinking fund footnote (1618).

Figure 17:
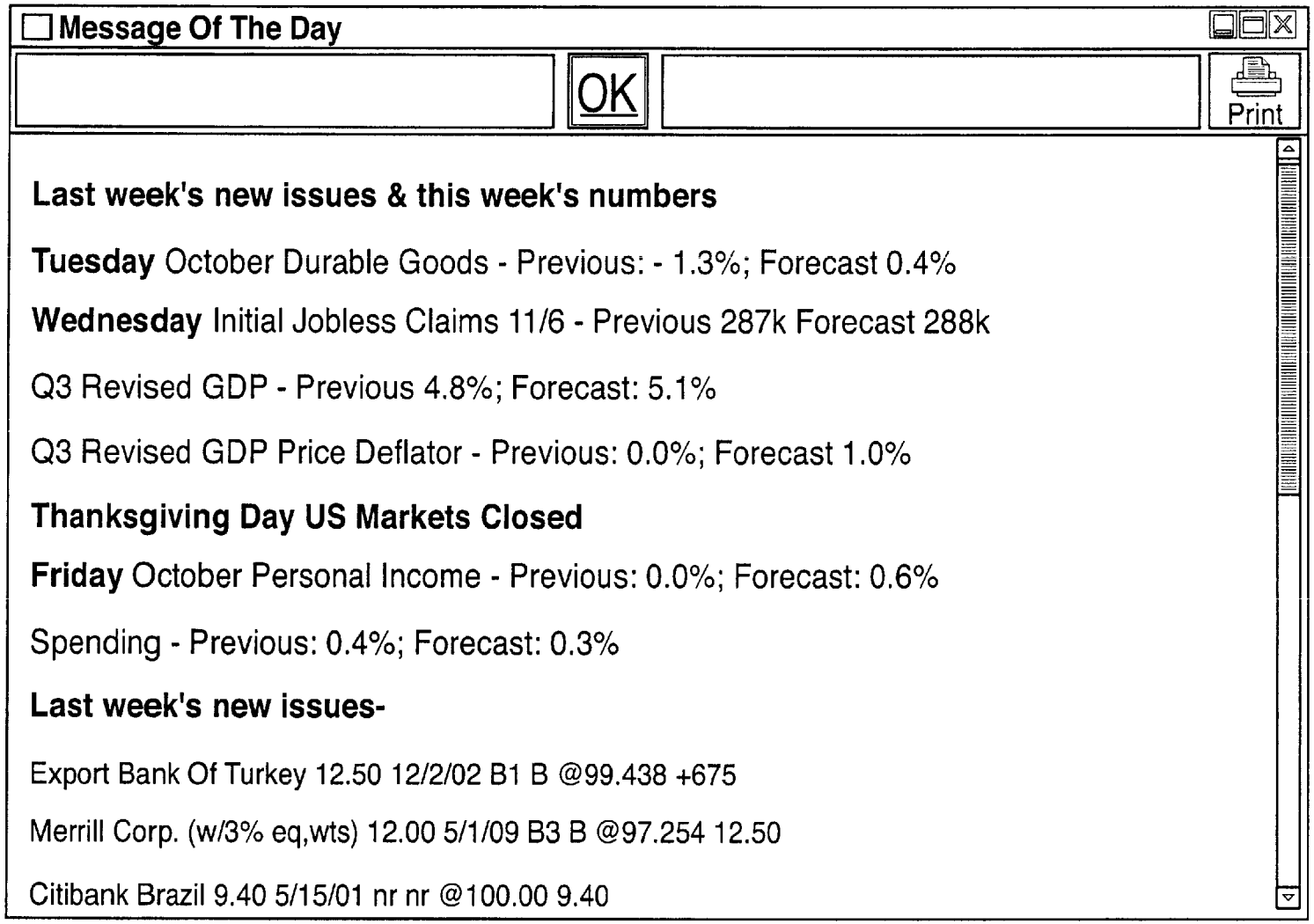
FIG. 17 illustrates an informational screen embodied in a message of the day graphical user interface.
Figure 18:
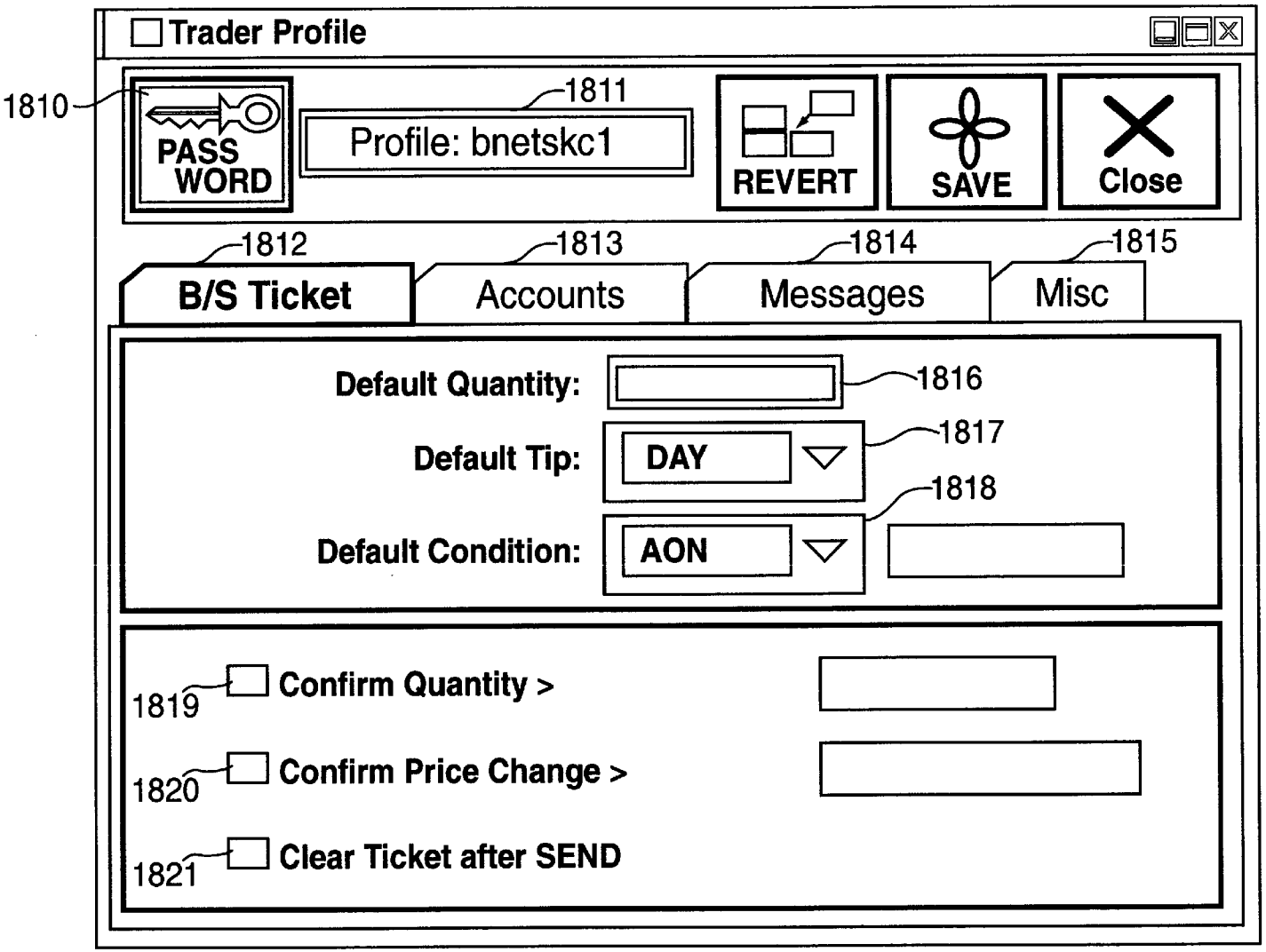
FIG. 18 illustrates a trader profile GUI.

FIG. 17 illustrates an informational screen embodied in a message of the day graphical user interface. Additional screens can include a trader profile such as the one illustrated in FIG. 18. A trader profile GUI can contain menus for password (1810), profile (1811), b/s ticket (1812), accounts (1813), messages (1814), miscellaneous (1815), default quantity (1816), default tip (1817), default condition (1818), confirm quantity (1819), confirm price change (1820), and clear ticket after send (1821).

Figure 19:
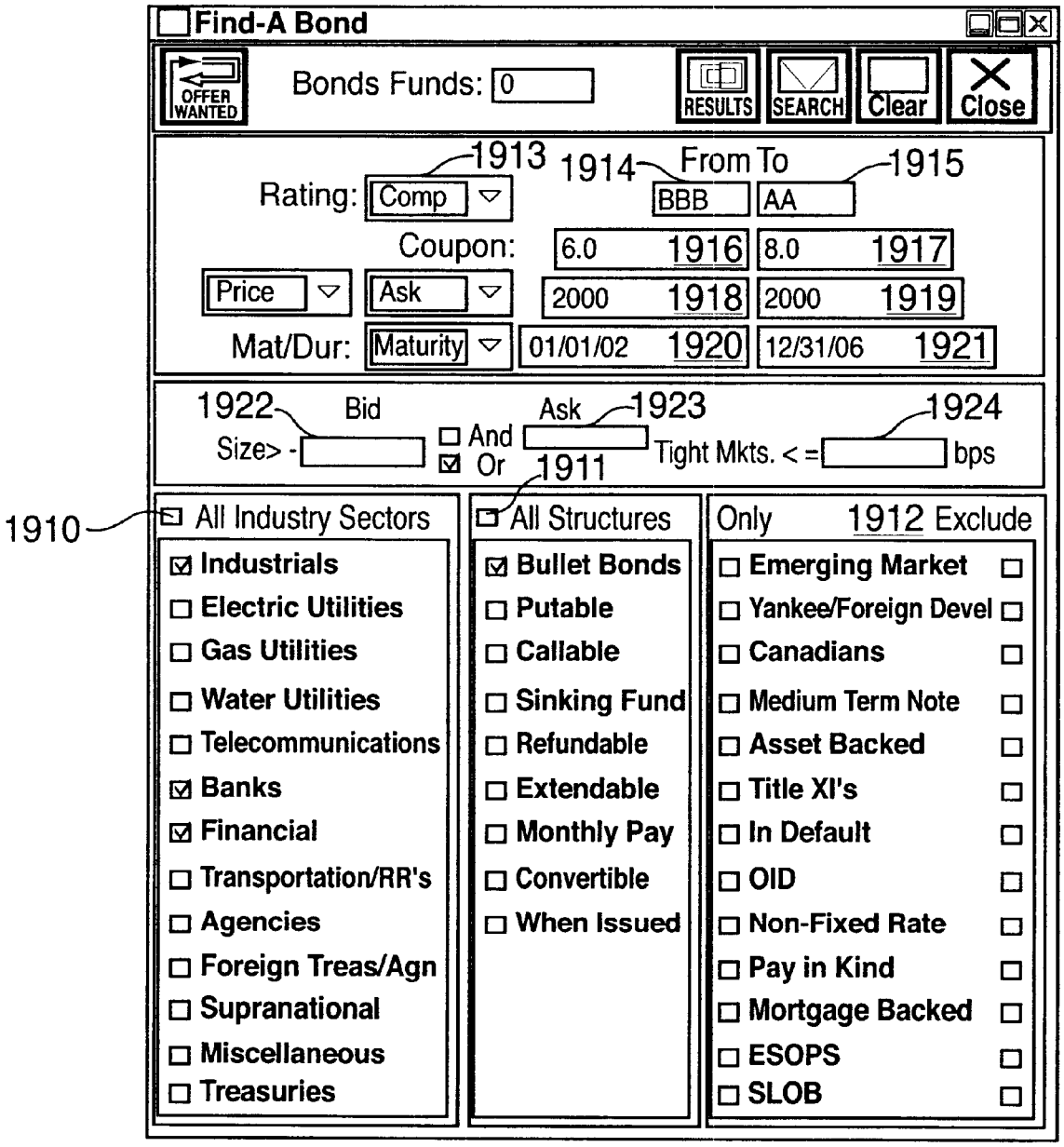
FIG. 19 illustrates a searching utility.

A searching utility can be embodied in a GUI such as that illustrated in FIG. 19 to help a trader find a bond based on criteria specific to the fixed income industry. A find-a-bond GUI can contain menus for rating (1913), range from (1914), range to (1915), coupon rate from (1916), coupon rate to (1917), price from (1918), price to (1919), maturity date from (1920), maturity date to (1921), bid size (1922), ask price (1923), tight markets (1924), industry sectors (1910), bond structures (1911), and ability to include or exclude certain bond characteristics (1912).

Figure 20:
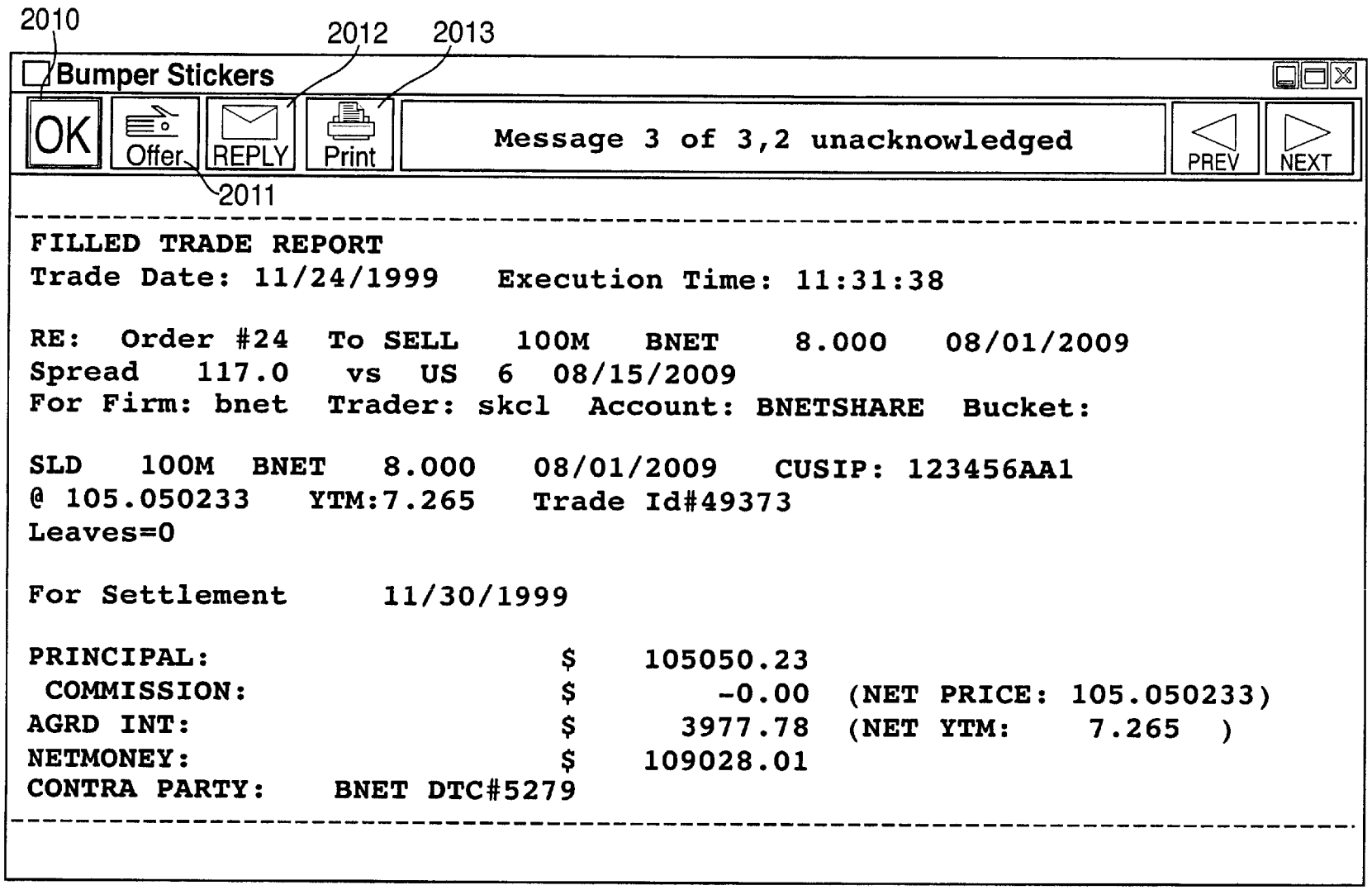
FIG. 20 illustrates a messaging system.

FIG. 20 illustrates a messaging system including functions allowing a trader to implement an offer or reply to the message. A bumper stickers GUI contains menus for okay symbol (2010), offer (2011), reply (2012), and print (2013).

Figure 21:
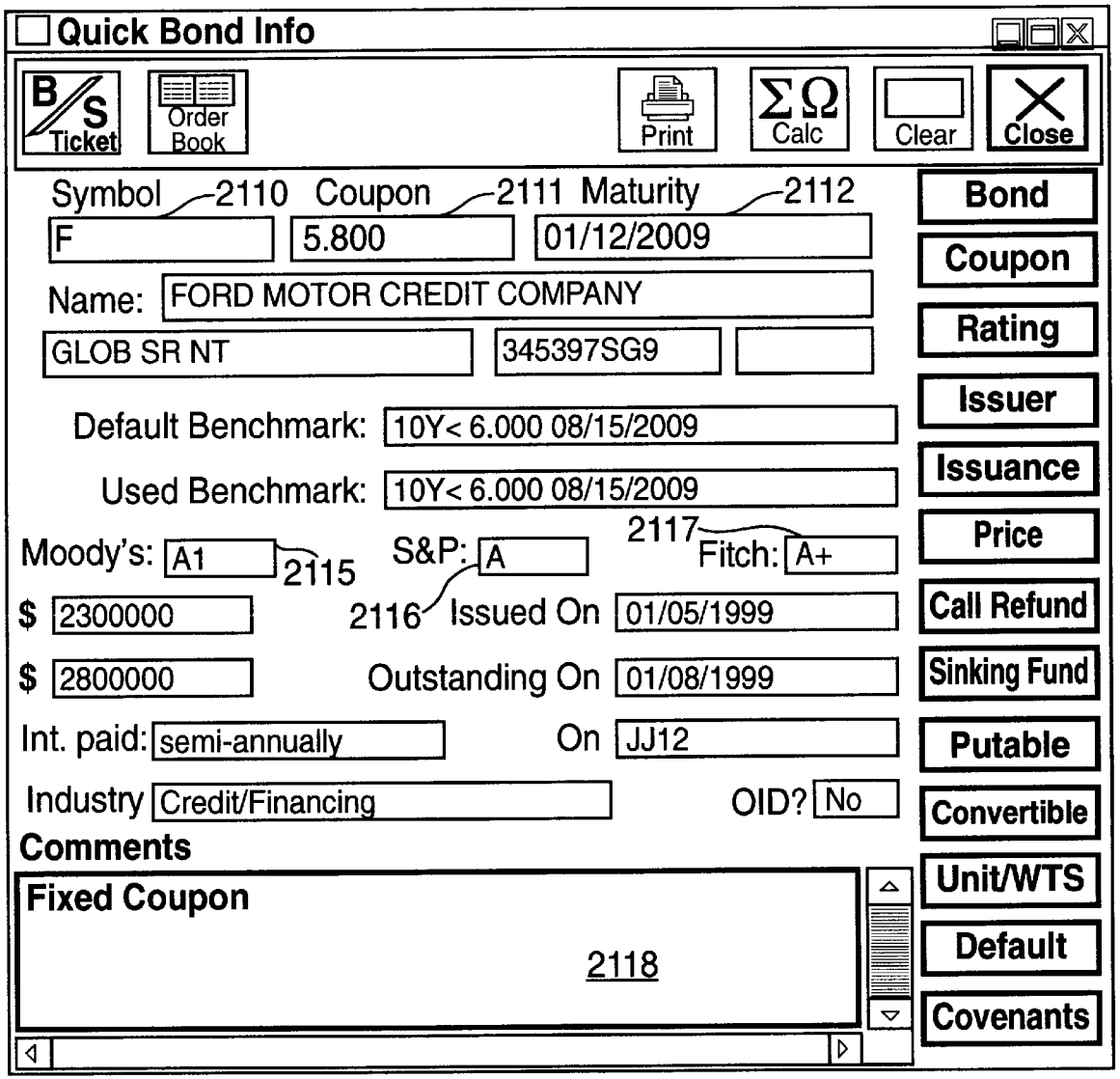
FIG. 21 illustrates a quick information GUI.

FIG. 21 illustrates quick information relating to a bond as well as user interactive devices that can be useful in launching additional graphical user interfaces containing more detailed information or additional functionality. A quick bond information GUI can contain menus for company name symbol (2110), coupon rate (2111), maturity date (2112), default benchmark (2113), used benchmark (2114), Moody's rating (2115), S&P rating (2116), Fitch rating (2117), and a comments section (2118).

Figure 22:
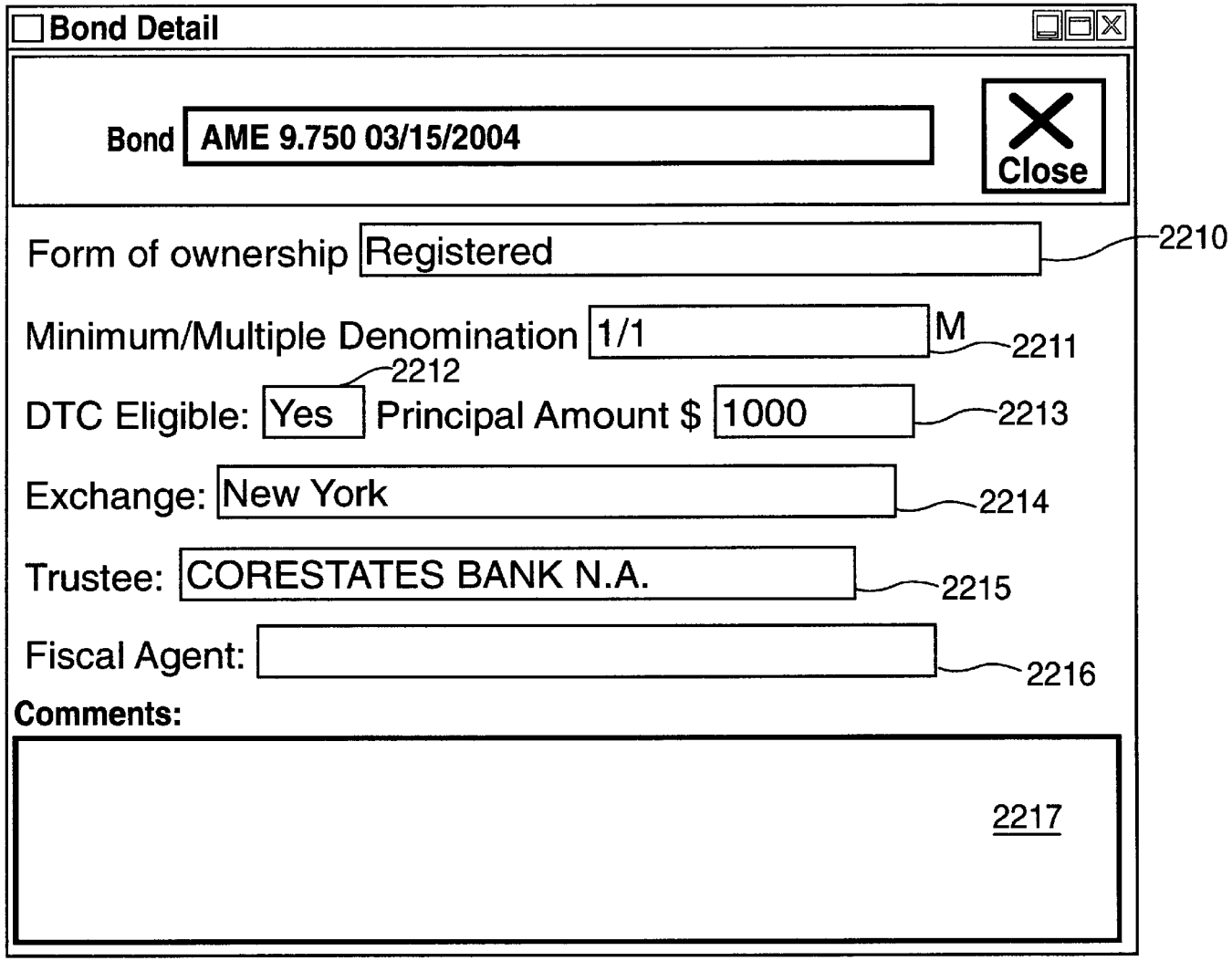
FIG. 22 illustrates a GUI with additional bond detail.

FIG. 22 illustrates a GUI with additional bond detail. A bond detail GUI can contain menus for ownership (2210), minimum/multiple denomination (2211), DTC eligibility (2212), principal amount (2213), currency exchange location (2214), trustee (2215), fiscal agent (2216), and comments (2217).

Figure 23:
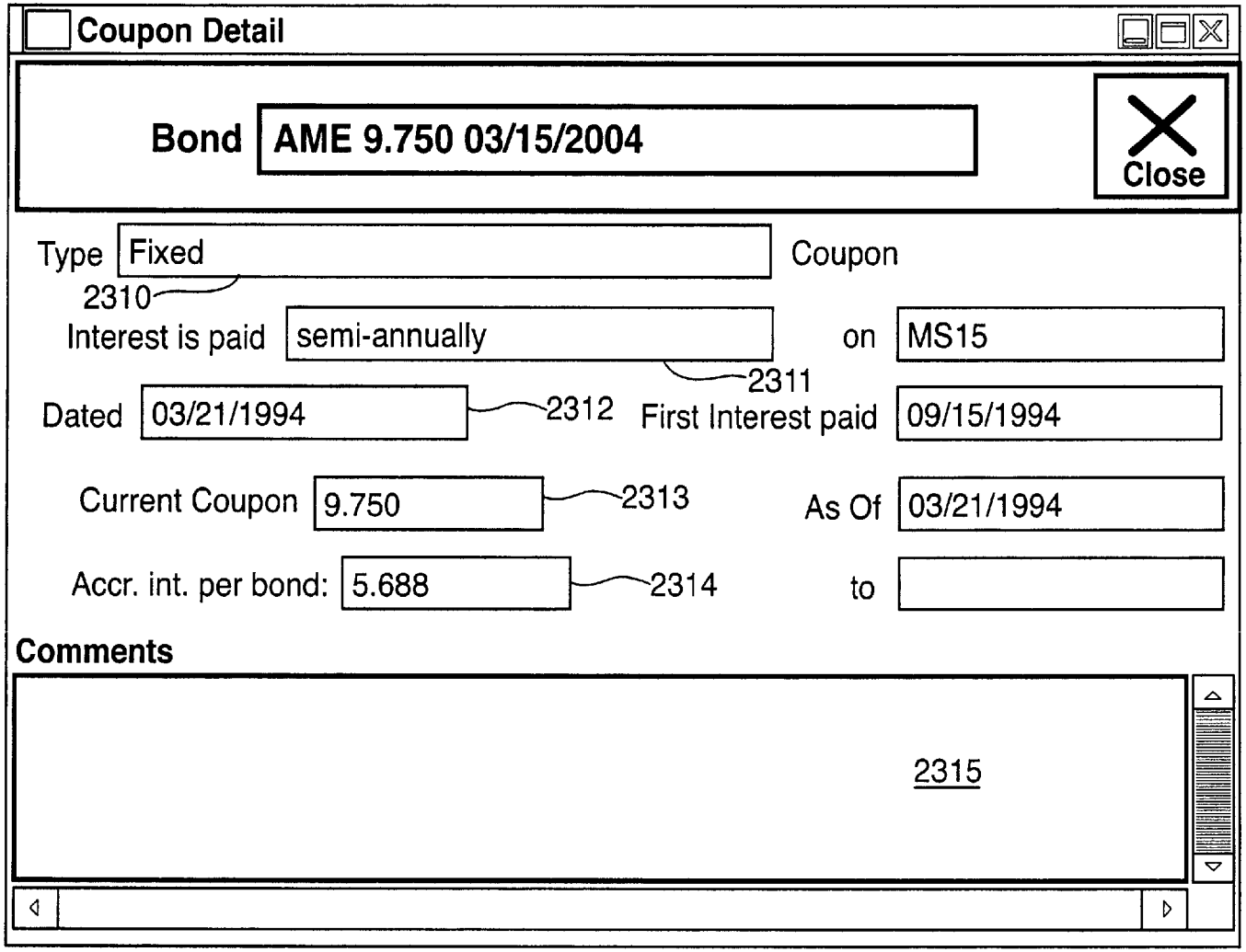
FIG. 23 illustrates a GUI with coupon detail.

FIG. 23 illustrates a GUI with coupon detail. A coupon detail GUI can contain menus for type of coupon (2310), timing of interest payment (2311), today's date (2312), current coupon rate (2313), accrual interest per bond (2314), and a comments section (2315).

Figure 24:
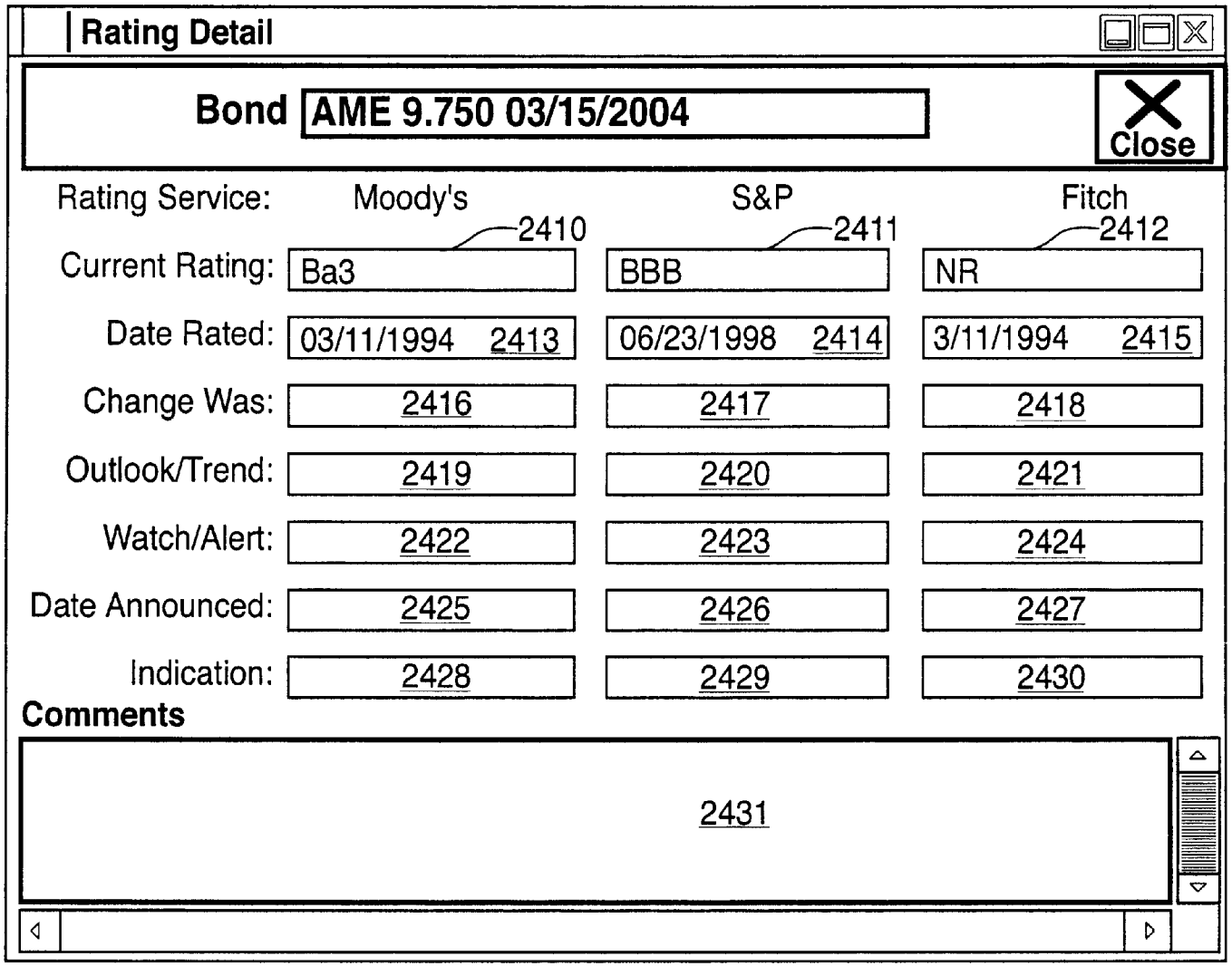
FIG. 24 illustrates a GUI with rating detail.

FIG. 24 illustrates a GUI with rating detail. A rating detail GUI can contain menus for showing current bond ratings by Moody's (2410), S&P (2411), Fitch (2412); date rated by Moody's (2413), S&P (2414), Fitch (2415); any change was by Moody's (2416), S&P (2417), Fitch (2418); outlook/trend by Moody's (2419), S&P (2420), Fitch (2421); watch/alert by Moody's (2422), S&P (2423), Fitch (2424); date announced by Moody's (2425), S&P (2426), Fitch (2427); indication by Moody's (2428), S&P (2429), Fitch (2430), and a comments section (2431).

Figure 25:
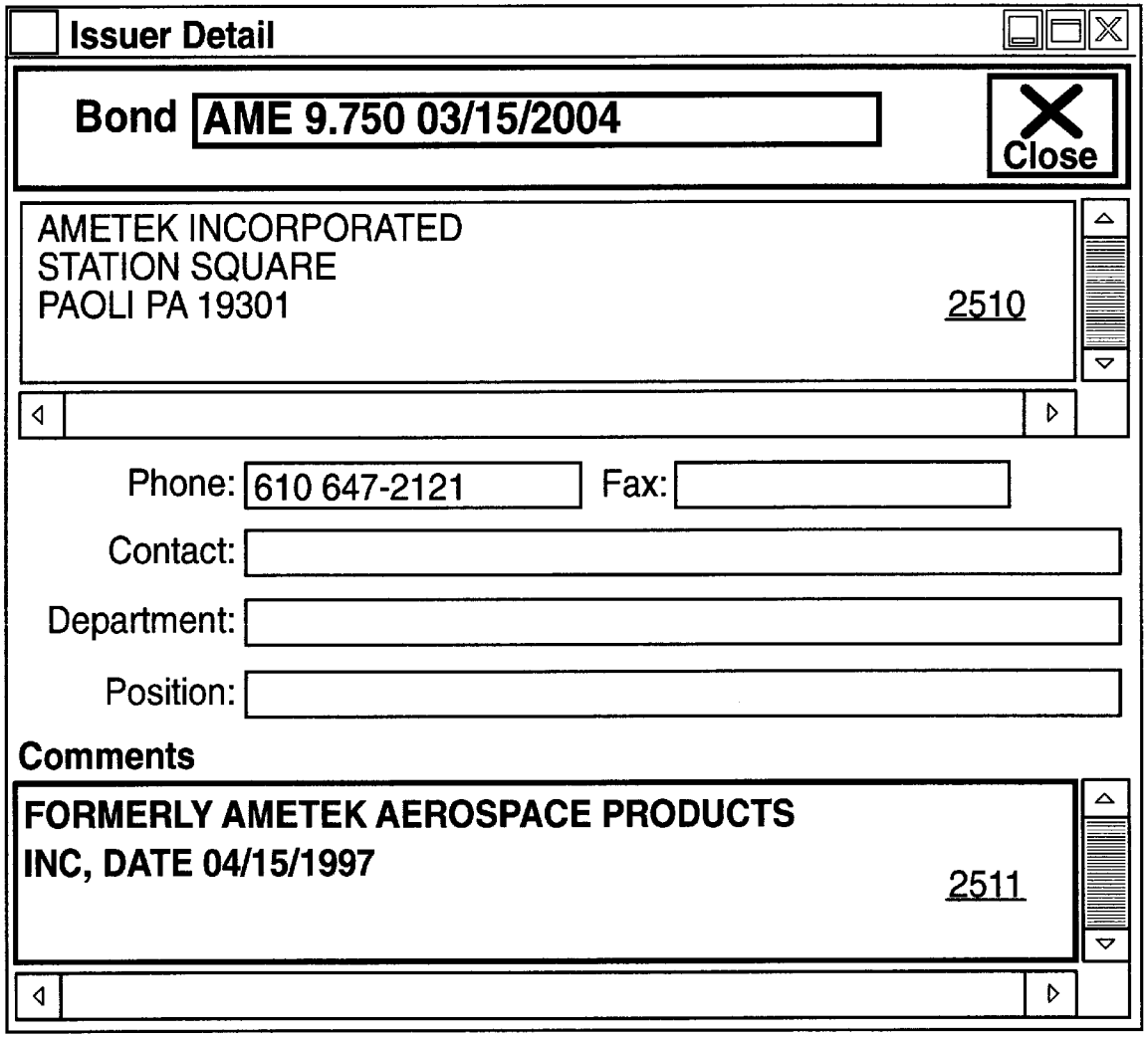
FIG. 25 illustrates a GUI with additional issuer detail and menus for address and comments.

FIG. 25 illustrates a GUI with additional issuer detail and menus for address of an issuer (2510), and any comments about the issuer (2511).

Figure 26:
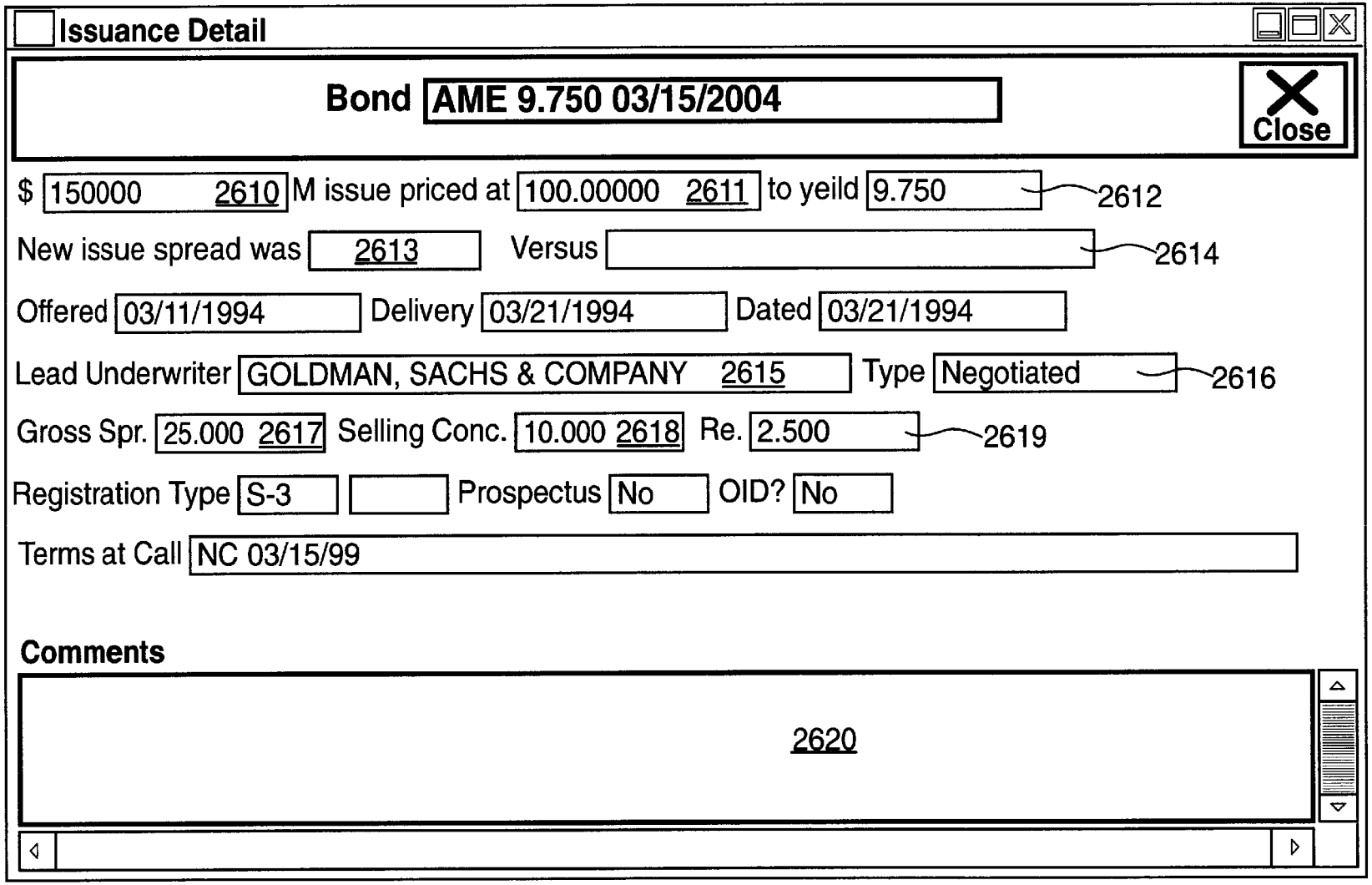
FIG. 26 illustrates a GUI with issuance detail.

FIG. 26 illustrates a GUI with issuance detail. An issuance detail GUI can contain menus for total amount of issuance (2610), priced at rate (2611), and the yield rate (2612). Other menus are issue spread (2613), old spread (2614), name of lead underwriter (2615), type (2616), gross spread amount (2617), selling concession (2618), regarding amount (2619), and a comments section (2620).

Figure 27:
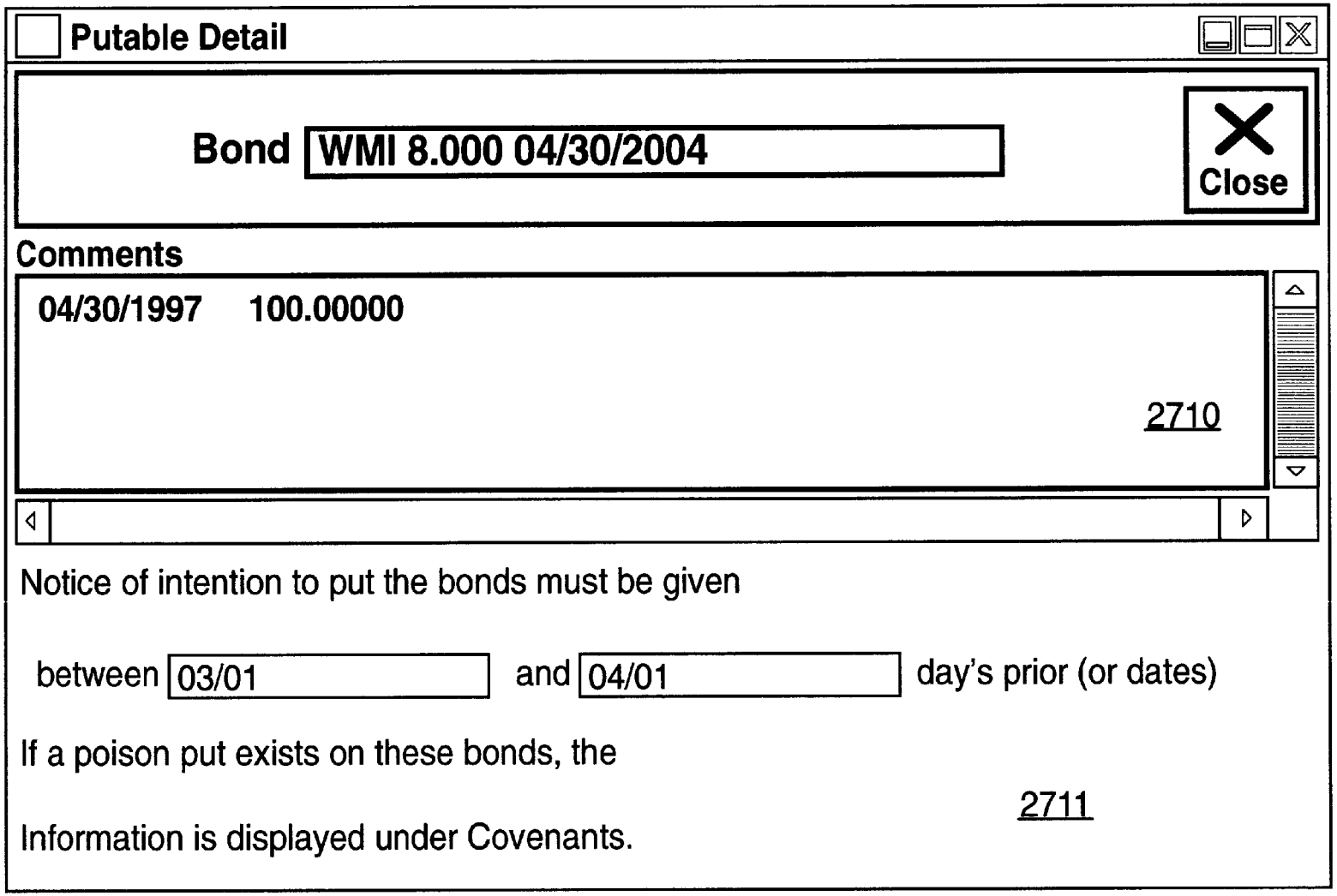
FIG. 27 illustrates a GUI with Putable detail.

FIG. 27 illustrates a GUI with Putable detail. A putable detail GUI can contain menus for comments (2710), and a section for notice of intention to put the bonds within a fixed timeframe (2711).

Figure 28:
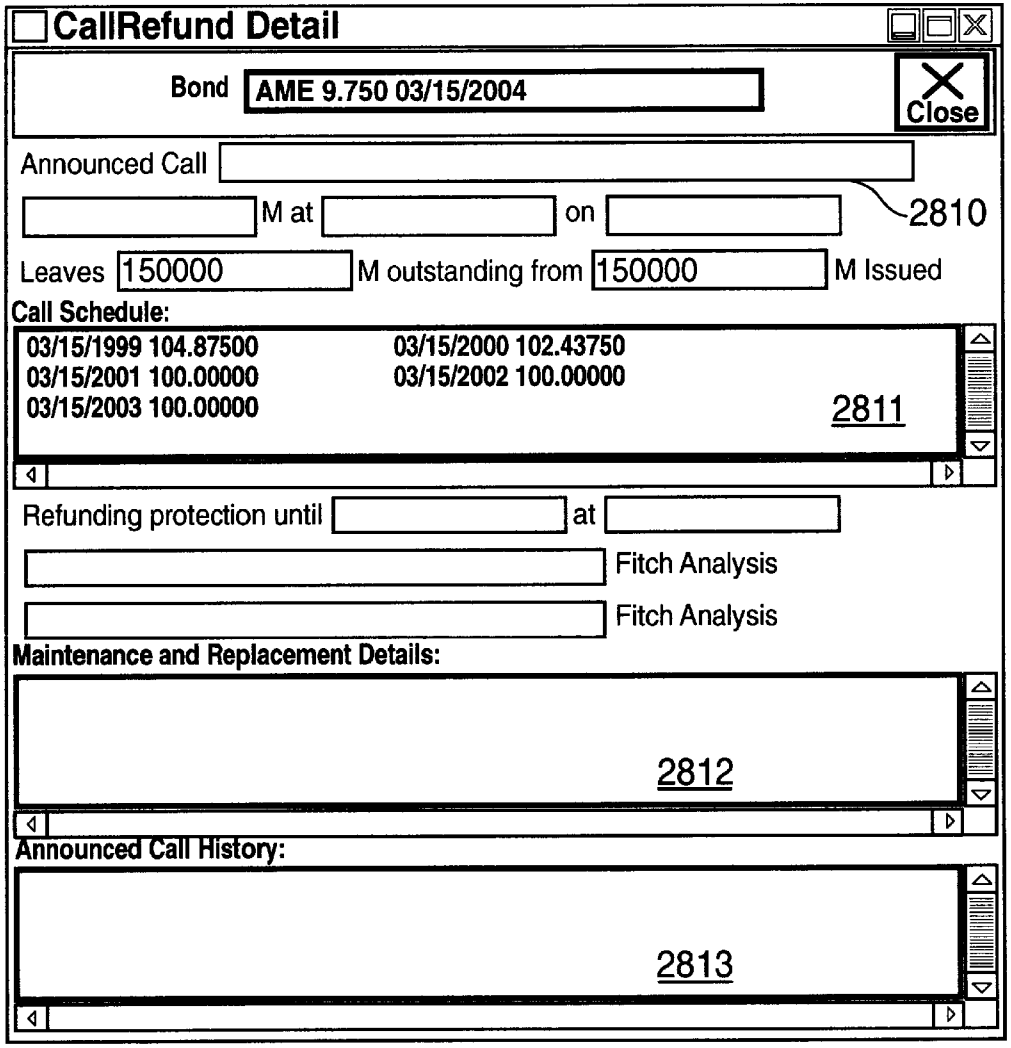
FIG. 28 illustrates a GUI with call refund detail.

FIG. 28 illustrates a GUI with call refund detail. A call refund detail GUI can contain menus for announced call (2810), call schedule (2811), maintenance and replacement details (2812), and announced call history (2813).

Figure 29:
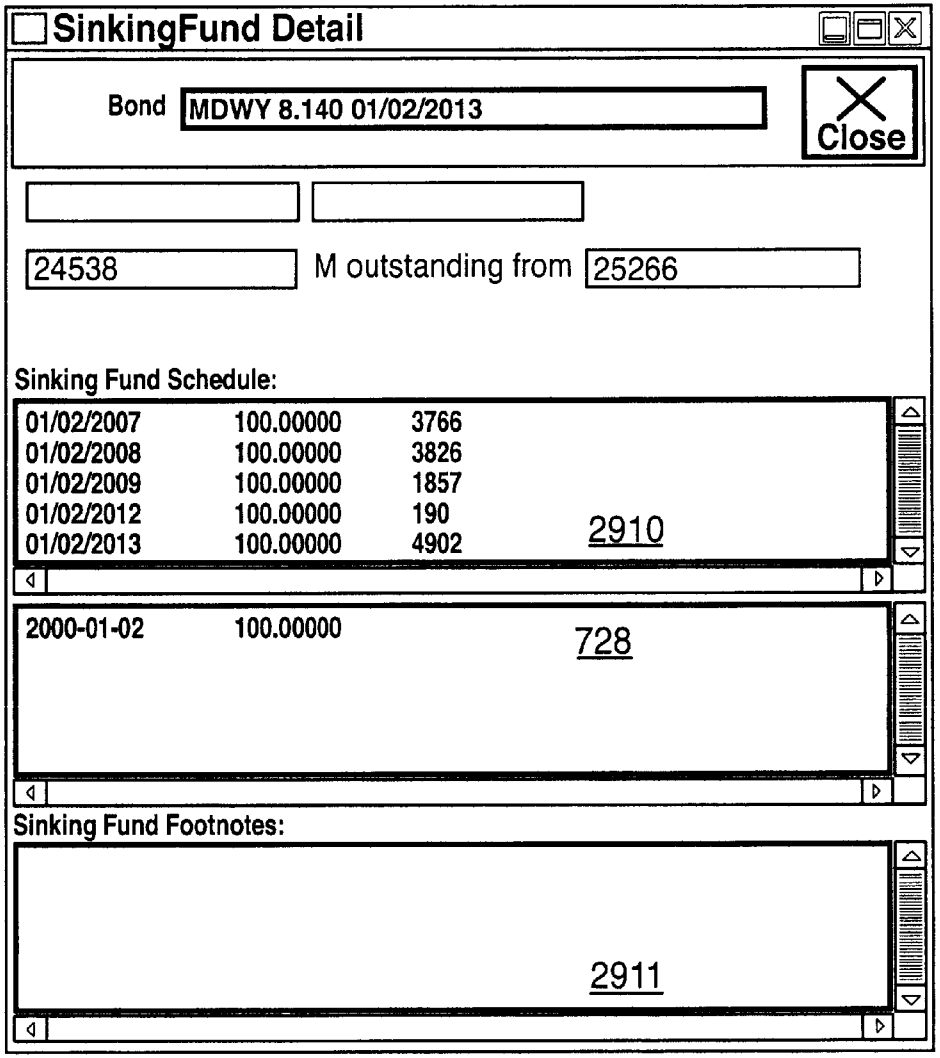
FIG. 29 illustrates a GUI with sinking fund detail.

A sinking fund detail GUI, exemplified in FIG. 29, can contain menus for sinking fund schedule (2910), and sinking fund footnotes (2911).

Figure 30:
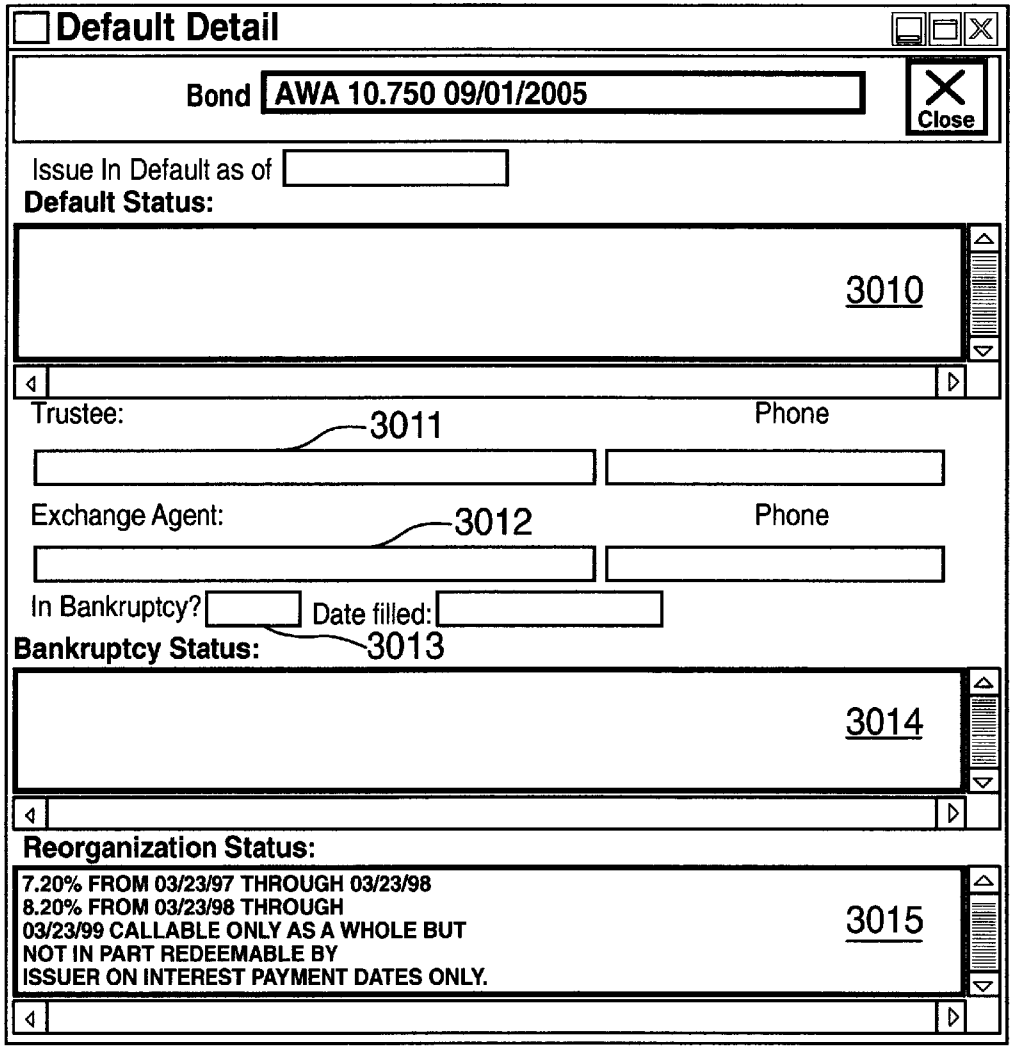
FIG. 30 illustrates a default detail GUI.

In FIG. 30 a default detail GUI is illustrated which can contain menus for default status of an issue (3010), trustee's name and phone number (3011), exchange agent's name and phone number (3012), whether in bankruptcy (3013), bankruptcy status (3014), and reorganization status (3015).

Figure 31:
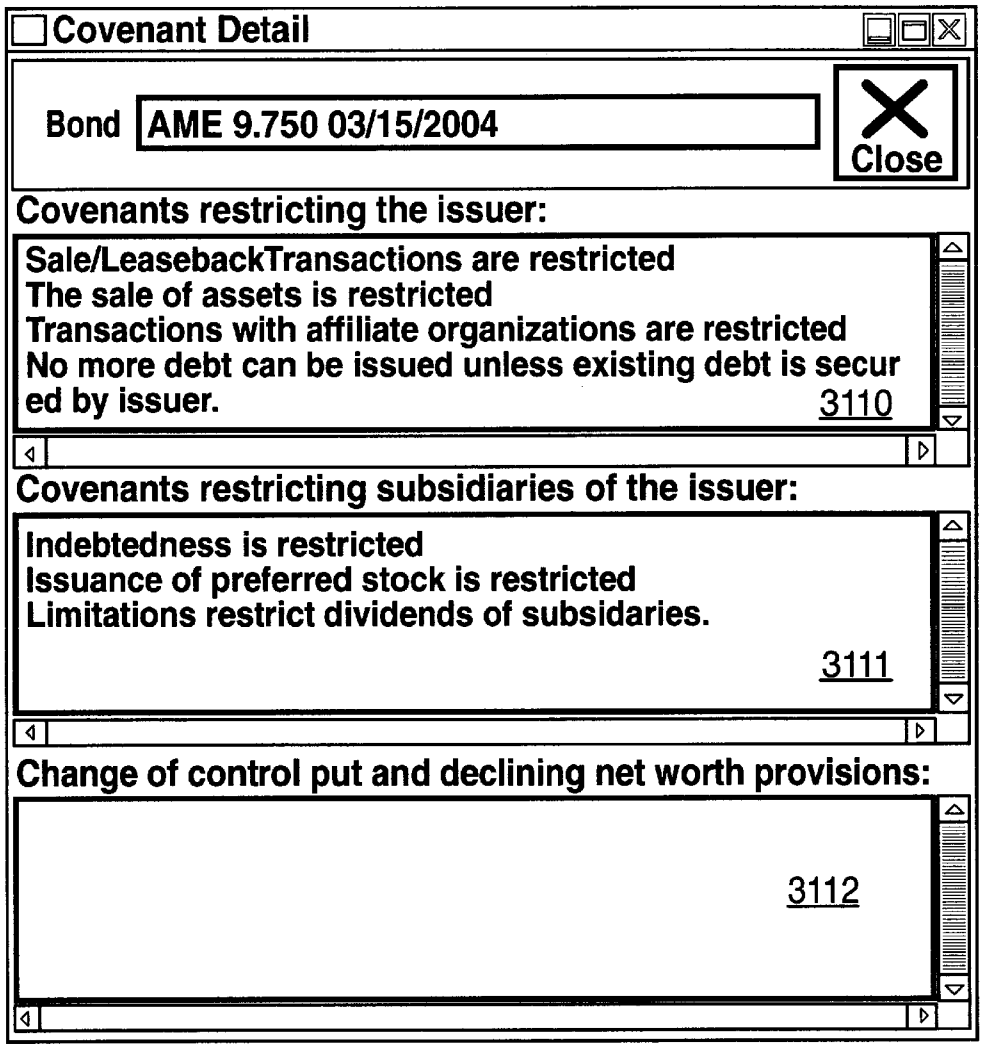
FIG. 31 illustrates a GUI with covenant detail.

A GUI with covenant detail, illustrated in FIG. 31, can contain menus for covenants restricting the issuer (3110), covenants restricting subsidiaries (3111), and change of control put and declining net worth provisions (3112).

Figure 32:
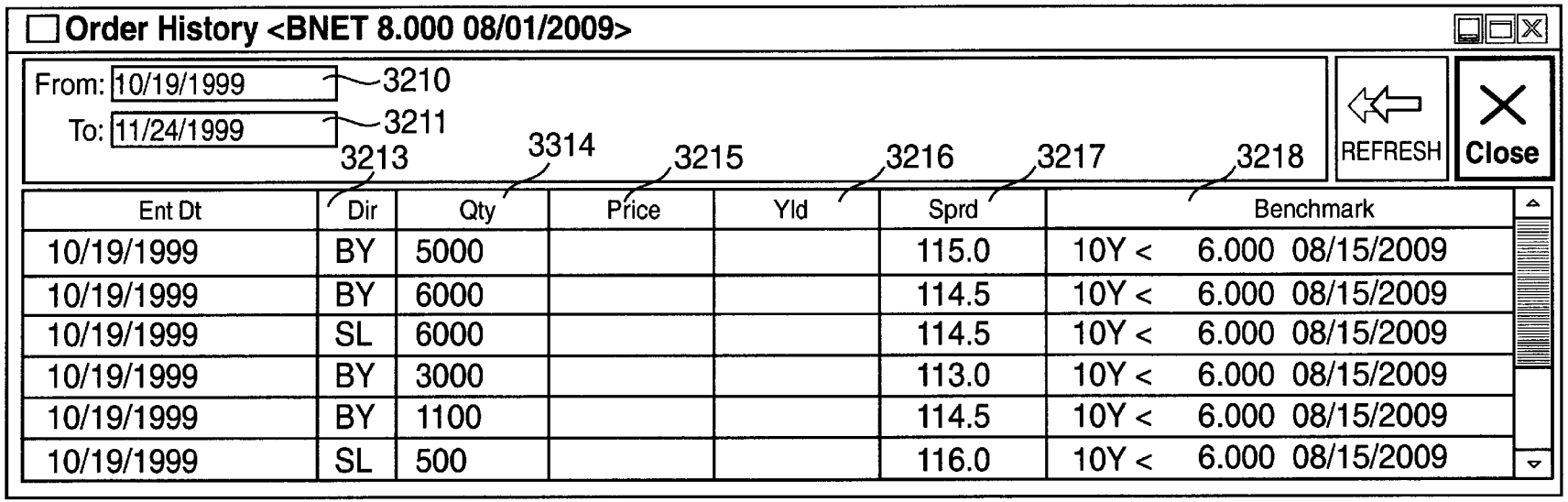
FIG. 32 illustrates an order history GUI.

FIG. 32 illustrates an order history GUI with menus for beginning of a query date (3210), end of the query date (3211), date of transaction (3212), directory (3213), quantity (3214), price (3215), yield (3216), spread (3217), and benchmark (3218). An order history GUI can contain menus for beginning of the query date (3210), end of the query date (3211), date of transaction (3212), directory (3213), quantity (3214), price (3215), yield (3216), spread (3217), and benchmark (3218).

Figure 33A:
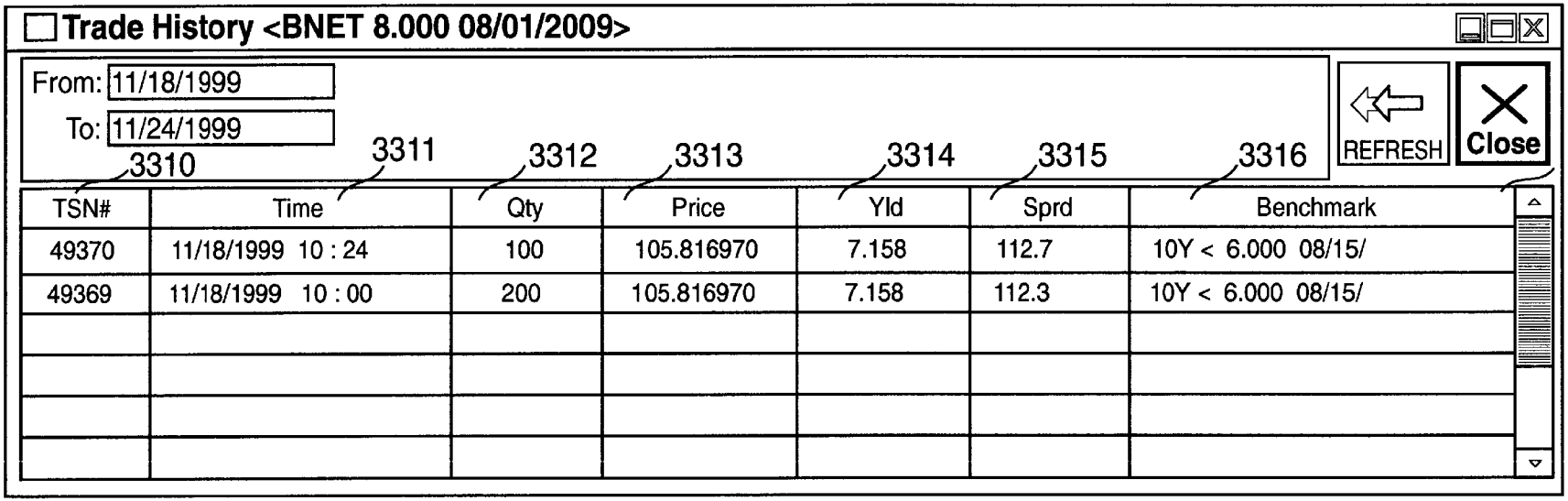
FIG. 33A illustrates a trade history GUI.
Figure 33B:
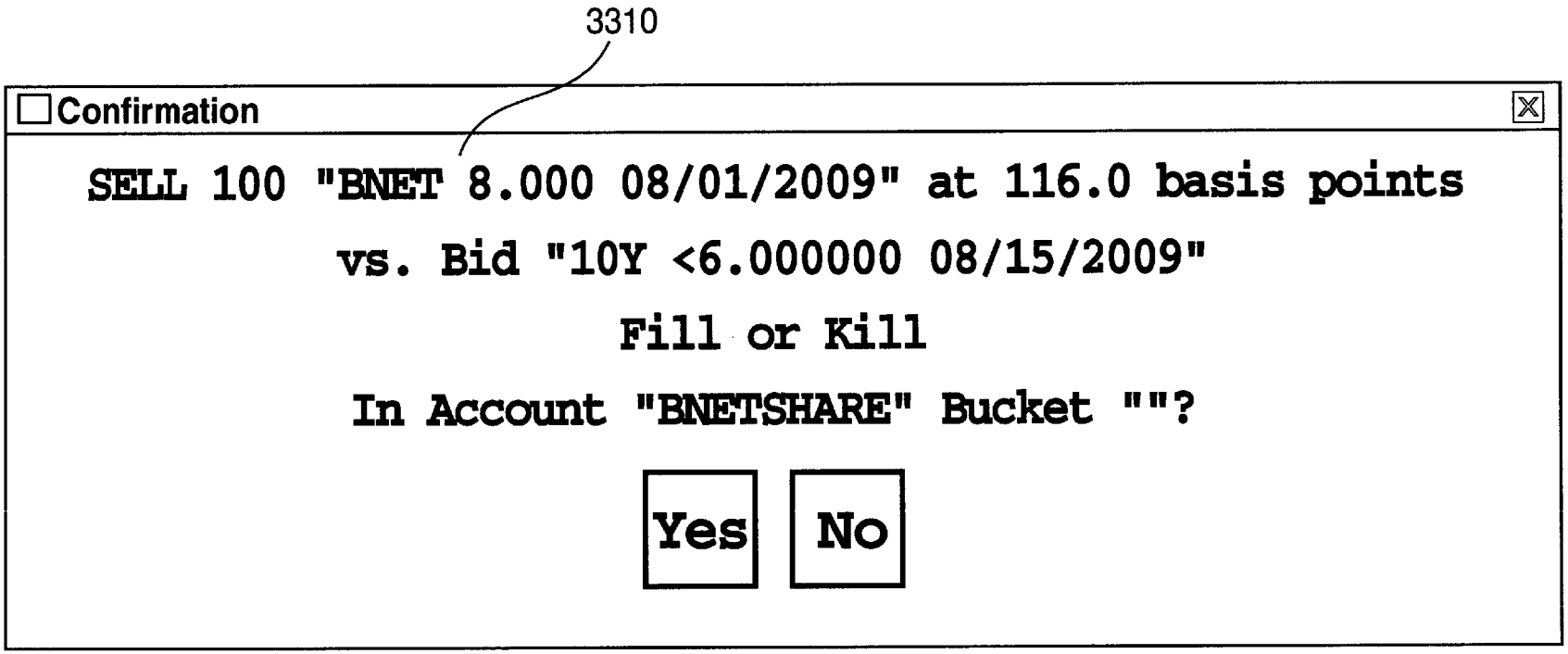
FIG. 33B illustrates a confirmation history GUI.

As illustrated in FIG. 33A, a trade history GUI can contain menus for transaction number (3310), time and date (3311), quantity (3312), price (3313), yield (3314), spread (3315), and benchmark (3316). FIG. 33B illustrates a confirmation GUI giving a user an option to sell a certain number of shares using the fill or kill caption (3310).

Screens containing GUIs with additional detail can also include interactive devices to launch an order or a sell command.

A FIT system can also include monitoring and reporting functionality that can be presented as printed reports or additional GUIs wherein the monitoring and functionality facilitates the efficient and successful trading of fixed income securities. For example, a FIT system can produce a report that contains details for each order that is X percent outside the best bid/offer in the system.

If there is only one bid/offer in the system for an issue, the order price should be compared against the most recent price from the system's last trade price or the price from IDC. The system's last trade price should be used if the trade dates of both sources are equal. If an issue does not have an order in the system, a last trade price in the system, or an IDC price, then "N/A" can be displayed in the related priced fields of a report. Reports can run at predetermined intervals such as every 10 minutes. In addition, reports can be executed upon request. In one embodiment, the report can be sorted by user ID and order number. FIG. 34 includes fields that can be included in a price surveillance report. FIG. 35 illustrates a process/data flow which can be utilized while implementing a price surveillance report. FIG. 36A and 36B illustrates a flow chart that can be used to generate a price surveillance report.

The price surveillance report can be based upon queries to an order table, a bond master table, a trade table, and/or daily price tables according to the mentioned process flow. A user table can contain user names needed for the report. User names can be obtained by querying a user table using a user ID or broker ID contained in an order audit table. In one embodiment, a file can also be made to export into another application, such as Microsoft Excel.

A trade volume report can also be generated at a regular intervals such as a daily trade volume report. The trade volume report can display daily trading volume by product and trading entity. The report can include a number of trades and a percentage of volume for each product within a trading entity. It can be generated by querying a trade table for a current day's trades sorted by trading entity. Within each trading entity, a count can be generated of the number of investment grade and/or high yield trades. A count can be accomplished using a Bond Sub Type field in a trade table wherein I will equal investment grades and H will equal high yield grades. Percentage of volume can be calculated by dividing the total number of trades executed by a trading entity by the number of trades executed for each product. The percent of the volume denominator can be the total number of trades within the entity, the aggregated total of all the trades in the system, or the aggregated total of all the trades within the system by product. A monthly trade volume report can show a total volume of trading within the system by product on a monthly basis. The report can include the number of trades and a percent of volume for each product. For example, a product can include investment grade or high yield grade instruments. A number of trades is an integer value and a percent of volume with total 100% in the aggregate. A monthly trade volume report can be generated by querying a trade table for all trades taking place during a current month or other specified month and listed by product. The report can also include a count for the number of investment grade trades and the number of high yield trades executed within the month, and calculate the total number of trades executed during the specified month. Percentage of volume can be calculated by dividing a total number of trades executed by the number of number of trades executed for each product.

To facilitate auditing purposes, it can be important to have the ability to track all orders in a system from the time the orders are submitted until the time they are cancelled or traded. A FIT system can include the ability to view exactly what a user modifies and/or status changes for each order that is executed. A table can be used to track activity for every order and generate reports for surveillance purposes. Exemplary activities include, input of an order, a modification to an order, a hold put on an order, reactivation of an order, canceling an order, or other actions which affect an order such that a record is needed to the audit table. To be most effective, a replace should not occur on this table. Only writes bases on dimension triggers or other specified triggers should be used to modify the table. In one embodiment, real time entry can be used to enter information into the order/audit table. A change from active status report can be run on a daily, weekly, monthly or other time period to track end of day displays of all orders that have a change from an active status in a minute or less. This report can be useful to monitor whether or not a user is continuously placing and immediately canceling or holding their order.

A live time should be calculated for all orders in an order audit table in which a change from active status occurs. If a change occurs in a minute or less then both instances of the order, the active and the cancelled or held must be placed in the report. The report can be sorted by fields such as user ID and order number.

In order to facilitate trading activity, a FIT system can store and readily access information relating to a trading participant. Trading participant information can include a company profile, credit ratings, credit analysis, financial information, and review information. A GUI can allow a user to query databases containing such information and present the information in any format conducive to the trading process. Interface screens can include informational fields, programmable interactive devices, and input fields. In addition, specialized icons can be set up to provide efficient execution of fixed income trading related functions.

A credit function can establish credit limits for its participants to facilitate the financial institution will bear a minimal amount of risk. Establishment and monitoring of online credit can facilitate trading and also protect a financial institution extending credit. To enforce the credit limits, the financial institution can monitor a participant's usage of credit throughout the trading day. The credit monitoring can be automated and in real time or semi-automated, based on reporting intervals, such as every 10 minutes. Reports can be generated reflecting credit monitoring. To support the data needs of reports, calculations can be performed and the results the calculations can be stored in variables (fields).

Credit exposure can be measured on a notional basis, i.e., no potential market risk will be incorporated into Exposure and termed Usage, wherein the Notional value=(price× quantity)+accrued interest. Reports can reflect aggregate values, such as Buys+Sells, as well as total buys and total sells.

Report detail can occur on a per entity, per product basis. Entity profile information can be obtained from the Credit Management System and be mapped against an associated credit activity. Reports can be processed according to the preferences of the financial institution or a client. For example, reports can be created after the generation of credit calculations, at the start-of-day, at the end of nightly batch cycle, at predetermined intervals such as every 10 minutes during the trading day and/or at the end-of-day after the non-executed orders have been purged.

In one embodiment a report can contain multiple views. Views can include, for example: a Report Summary with a macro view, per entity, per product of credit usage; Investment Grade with per entity detail of buy and sell contribution to credit usage; High Yield with per entity detail of buy and sell contribution to credit usage; or Municipals with per entity detail of buy and sell contribution to credit usage. Report data can be sorted according to specific needs, for example, data can be sorted from highest to lowest by Utilization, then from highest to lowest by Current (aggregate) exposure, then from A to Z by Trading Entity. An example is included in Table 1 below.

TABLE 1

| Trading Entity | Current Exposure | Utilization |
|---|---|---|
| Echo Company | 78,000 | 78% |
| Frank Company | 65,000 | 78% |
| Tango Company | 65,000 | 78% |
| Charlie Company | 34,400 | 67% |
| Bravo Company | 15,000 | 56% |
| Alpha Company | 60,000 | 45% |
| Delta Company | 32,450 | 35% |

In order to provide consistency in credit analysis and reporting, terms can be defined for a person accessing the system. For example, a Trading Entity can include the name of the trading entity associated with the credit usage information. An Ultimate Parent can include an ultimate parent of the trading entity. A Client Industry can be defined as an industry of the trading entity, and a financial institution Account Number as an account number associated with the trading entity. A financial institution Internal Credit Rating can include a credit rating assigned by the financial institution to a trading entity. Aggregate Failed can indicate the combined failed trades as of the start-of-day for a given trading entity and can be based upon the sum of fail information.

An Aggregate Start-of-Day Credit Balance can indicate remaining credit available as of the start-of-day, based upon the difference between an aggregate limit and the sum of unsettled trade and aggregate fail information. An Aggregate Current Day Activity for a given trading entity can indicate a combined usage of credit for current day activity as of the time the report was generated, based upon the sum of buy orders, sell orders, executed buys, and executed sells. Aggregate Current Usage can define an overall usage of credit for the current day as of the time the report was generated, based upon the sum of aggregate current day activity and aggregate open commitments. Aggregate Utilization can include the overall percentage of the credit limit that has been used for the current day as of the time the report was generated, based upon the quotient of aggregate current usage and the aggregate limit. Aggregate Limit can include an overall credit limit, assigned by the Credit department, for a given trading entity.

Investment Grade Open Commitments can refer to a combined usage of credit that is attributed to investment grade trades made as of the start-of-day, based upon the sum of unsettled trade and fail information for investment grade trades. Investment Grade Current Day Activity can represent a combined usage of credit for current day activity that is attributed to investment grade trades as of the time a report is generated, based upon the sum of buy orders, sell orders, executed buys, and executed sells for investment grade trades. Investment Grade Current Usage can include an overall usage of credit for the current day that is attributed to investment grade trades as of the time the report was generated, based upon the sum of current day usage and start-of-day credit balance for investment grade trades.

The combined usage of credit that is attributed to high yield trades made as of the start-of-day and based upon the sum of unsettled trade and fail information for high yield trades can be referred to as a High Yield Open Commitment. A High Yield Current Day Activity can define combined usage of credit for current day activity that can be attributed to high yield trades as of the time the report was generated, based upon the sum of buy orders, sell orders, executed buys, and executed sells for high yield trades. High Yield Current Usage can define an overall usage of credit for the current day that is attributed to high yield trades as of the time the report was generated, based upon the sum of current day usage and start-of-day credit balance for high yield trades.

Municipal Open Commitments can indicate a combined usage of credit that is attributed to municipal trades made as of the start-of-day, based upon the sum of unsettled trade and fail information for municipal trades. Municipal Current Day Activity can define a combined usage of credit for current day activity that is attributed to municipal trades as of the time the report was generated, based upon the sum of buy orders, sell orders, executed buys, and executed sells for municipal trades and Municipal Current Usage,. the overall usage of credit for the current day that is attributed to municipal trades as of the time the report was generated, based upon the sum of current day usage and start-of-day credit balance for municipal trades.

For a given product type, Unsettled Buys can represent the total unsettled buys as of the start-of-day, based upon the sum of all unsettled buys for a given trading entity, for the product type upon which the report view focuses. Similarly, Failed Buys can represent a total of failed trades as of the start-of-day, based upon the sum of all failed trades for a given trading entity, for the product type upon which the report view focuses. Executed Buys can define a total of executed buys for the current day as of the time the report was generated, based upon the sum of all executed buys for a given trading entity, for the product type upon which the report view focuses.

Total buy orders for a current day and based upon the sum of all buy orders for a given trading entity, for a product type can be referenced as Buy Orders. Unsettled Sells can define a total of unsettled sells as of the start-of-day, based upon the sum of all unsettled sells for a given trading entity, and for a product type. Similarly, Failed Sells can equal the total failed trades as of the start-of-day, based upon the sum of all failed trades for a given trading entity, for the product type upon which the report view focuses. Executed Sells can define a total of executed sells for the current day as of the time the report was generated, based upon the sum of all executed sells for a given trading entity and/or a product type. Sell Orders can indicate a total of sell orders for a current day as of the time a report is generated, and can be based upon a sum of all sell orders for a given trading entity, for the product type upon which a report view focuses.

Open Commitments can indicate a combined usage of credit that can be attributed to investment grade trades made as of the start-of-day, based upon the sum of unsettled trade and fail information for a given trading entity, for the product type upon which the report view focuses.

The percentage of the current usage of credit that is attributed to buys made as of the time the report was generated and based upon quotient of buy activity such as the sum of unsettled buys, failed buys, executed buys, buy orders and current usage for a given trading entity, can be included in a Percentage Long.

Current Day Activity can indicate a combined usage of credit for current day activity as of the time the report was generated, based upon the sum of buy orders, sell orders, executed buys, and executed sells for a given trading entity, for the product type upon which the report view focuses. Current Usage can define an overall usage of credit for a current day, based upon the sum of current day activity and open commitments, for a given trading entity and/or a product type.

Credit reporting calculations can occur and the resulting values can be stored and referenced to monitor the extension of credit as it relates to a client's trading position. Customer profile information can also be obtained and matched against corresponding credit detail information to aid in the analysis of extended credit. Analysis can take place at predetermined intervals, such as every 10 minutes during the trading day and/or the end-of-day. Credit reporting calculations can occur and the resulting values will be referenced or stored.

The invention may advantageously be implemented in one or more computer programs that are executed on a programmable system including at least one programmable processor coupled to receive data and instructions from, and to transmit data and instructions to, a data storage system; at least one input device; and, at least one output device. Each computer program may be implemented in a high-level procedural or object-oriented programming language, or in assembly or machine language if desired; and in any case, the language may be a compiled or interpreted language. Suitable processors include both general and special purpose microprocessors.

Computers or other network access devices in the online fixed income trading system may be connected to each other by one or more network interconnection technologies. For example, dial-up lines, token-ring and/or Ethernet networks, T1 lines, asynchronous transfer mode links, wireless links, Digital Subscriber Line (DSL) lines and integrated service digital network (ISDN) connections may all be combined in the network 100. Other packet network and point-to-point interconnection technologies may also be used. Additionally, the functions associated with separate processing and database servers in the host may be integrated into a single server system or may be partitioned among servers and database systems that are distributed over a wide geographic area.

A number of embodiments of the present invention have been described. Nevertheless, it will be understood that various modifications may be made without departing from the spirit and scope of the invention. For example, client computers 101–106 can comprise a personal computer executing an operating system such as Microsoft Windows™, Linux™, Unix™, or Apple MacOS™, Palm OS, as well as software applications, such as a web browser. Network access devices can be terminal devices, a computer, a personal digital assistant or a palm-type computer WEB access device that adheres to a point-to-point or network communication protocol such as the Internet protocol. Other examples can include TV WEB browsers, terminals, and wireless access devices (such as a 3-Com Palm VII organizer). A client computer may include a processor, RAM and/or ROM memory, a display capability, an input device and hard disk or other relatively permanent storage. Accordingly, other embodiments are within the scope of the following claims.

What is claimed is:

1. A computer-implemented method for providing fixed income securities trading via a communications network, the method comprising:

transmitting data relating to trading a fixed income security;

receiving information related to the sale of a fixed income security;

transmitting a live order from an anonymous trader, wherein the live order is related to the information received; and providing a commitment to market liquidity related to the live order.

2. The method of claim 1 additionally comprising the step of executing a trade instruction responsive to the live order.

3. The method of claim 2 additionally comprising the step of acting as counterparty to a first trade, wherein the first trade is executed as a result of the trade instruction.

4. The method of claim 1 additionally comprising the step of executing a second trade to offset the first trade.

5. The method of claim 1 wherein the fixed income security is a corporate bond.

6. The method of claim 1 wherein the fixed income security is a municipal bond.

7. The method of claim 1 additionally comprising the step of transmitting financial data related to the live order to a credit system and receiving approval from the credit system to process the trade.

8. The method of claim 7 wherein transmission of the financial data is realized by real time trade monitoring via client web access.

9. The method of claim 1 additionally comprising the step of executing the trade.

10. The method of claim 1,7 or 8 additionally comprising the step of transmitting data related to the trade to a settlement system.

11. A method for providing credit authorization for automated trading of fixed income securities, the method comprising:

monitoring a client access an automated fixed income trading system via an electronic communications network;

receiving data from the client related to an order for a fixed income security;

referencing a credit limit for the client placing the order;

calculating a level of credit extended to the client inclusive of an amount necessary to execute the order;

transmitting approval to execute the order;

receiving confirmation of an executed order; and transmitting details of the executed order to a settlement system.

12. The method of claim 11 wherein monitoring client access to the fixed income trading system is accomplished in real time.

13. A computer system for providing fixed income trading via a computerized network, the system comprising:

a computer server accessible with a network access device via a communications network; and executable software stored on the server and executable on demand, the software operative with the server to cause the system to:

transmit data relating to trading fixed income securities;

receive an instruction to buy or sell a fixed income security;

transmit a live order from an anonymous trader, wherein the live order is related to the instruction to buy or sell a fixed income security; and provide a commitment to market liquidity related to the live order.

14. The computer system of claim 13 wherein the executable software is additionally operative to cause the system to act as counterparty to a trade responsive to the live order.

15. The computer system of claim 14 wherein the executable software is additionally operative to cause the system to act as counterparty to an additional trade offsetting to the trade responsive to the live order.

16. The computer communications system of claim 13 wherein the network access device comprises a computer.

17. The computer communications system of claim 13 wherein the computer communication network conforms to the transmission control protocol/internet protocol.

18. The computer communications system of claim 17 wherein the communication network comprises private network.

19. The computer communications system of claim 13 wherein the communication network comprises the Internet.

20. Computer executable program code residing on a computer-readable medium, the program code comprising instructions for causing the computer to:

transmit data relating to trading fixed income securities;

receive an instruction to buy or sell a fixed income security;

transmit a live order from an anonymous trader, wherein the live order is related to the instruction to buy or sell a fixed income security; and provide a commitment to market liquidity related to the live order.

21. A method for a client to interact with a network access device in order to complete a fixed income security transaction, the method comprising the steps of:

interacting with a host computer on a computer communications network;

viewing a data stream content via a graphical user interface, wherein the data stream content comprises an offer to buy or sell a fixed income security;

transmitting an instruction to execute an anonymous trade relating to a specific fixed income security; and receiving a commitment to market liquidity relating to the specific fixed income security.

22. The method of claim 21 for interacting with a network access device additionally comprising the step of receiving confirmation of an executed trade relating to the specific fixed income security, wherein a provider of the host computer acts as counterparty to the client in the trade.

23. A computer data signal embodied in a digital data stream comprising data relating to a fixed income security transaction, wherein the computer data signal is generated by a method comprising the steps of:

interacting with a host computer on a computer communications network;

viewing a data stream content via a graphical user interface, wherein the data stream content comprises an offer to buy or sell a fixed income security;

transmitting an instruction to execute an anonymous trade relating to a specific fixed income security; and receiving a commitment to market liquidity relating to the specific fixed income security.

24. A computer data signal embodied in a digital data stream comprising data relating to a fixed income security transaction, wherein the computer data signal is generated by a method comprising the steps of:

transmitting data relating to trading a fixed income security;

receiving information related to the sale of a fixed income security;

transmitting a live order from an anonymous trader, wherein the live order is related to the information received; and providing a commitment to market liquidity related to the live order.

25. A computer data signal as in claim 23 or 24 wherein the signal generated adheres to the transmission control protocol/internet protocol.

* * * * *